United States Patent
Nakajima et al.

(10) Patent No.: US 7,548,656 B2
(45) Date of Patent: Jun. 16, 2009

(54) METHOD AND APPARATUS FOR PROCESSING IMAGE SIGNALS BY APPLYING A MULTI-RESOLUTION CONVERSION PROCESSING FOR REDUCING THE IMAGE SIZE AND APPLYING A DYADIC WAVELET TRANSFORM

(75) Inventors: Takeshi Nakajima, Hino (JP); Tsukasa Ito, Musashino (JP); Tsuyoshi Hattori, Hidaka (JP); Shoichi Nomura, Hachioji (JP); Chizuko Ikeda, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 944 days.

(21) Appl. No.: 10/754,003

(22) Filed: Jan. 8, 2004

(65) Prior Publication Data

US 2004/0234166 A1    Nov. 25, 2004

(30) Foreign Application Priority Data

Jan. 16, 2003    (JP)    ............................. 2003-008217

(51) Int. Cl.
  *G06K 9/36* (2006.01)
  *G06K 9/46* (2006.01)
(52) U.S. Cl. .................................................. 382/240
(58) Field of Classification Search ........................ None
  See application file for complete search history.

(56) References Cited

U.S. PATENT DOCUMENTS 5,546,477 A * 8/1996 Knowles et al. ............. 382/242
5,870,502 A * 2/1999 Bonneau et al. ............. 382/249
6,041,143 A * 3/2000 Chui et al. ................... 382/232

(Continued)

FOREIGN PATENT DOCUMENTS

JP    63-026783 A    2/1988

OTHER PUBLICATIONS

Mallet, "A Wavelet Tour of Signal Processing" Second Edition, Academic Press, 1998, pp. 189-200.*

(Continued)

*Primary Examiner*—Matthew C Bella
*Assistant Examiner*—Yuzhen Ge
(74) *Attorney, Agent, or Firm*—Frishauf, Holtz, Goodman & Chick, P.C.

(57) ABSTRACT

There are described image-processing method and apparatus, which make it possible to reduce the processing load even in the image-processing environment employing the Dyadic Wavelet transform. The apparatus includes a reading section to read an image recorded on a recording medium so as to generate image signals representing the image; a first converting section to apply a multi-resolution conversion processing of at least level 1, which is capable of reducing an image size of the image signals, to the image signals, so as to generate first-converted image signals from the image signals; and a second converting section to apply a Dyadic Wavelet transform of at least level 1 to low frequency band component signals included in the first-converted image signals, so as to generate second-converted image signals from the first-converted image signals. An image size of the first-converted image signals is smaller than that of the image signals.

32 Claims, 11 Drawing Sheets

U.S. PATENT DOCUMENTS

| | | | | |
|---|---|---|---|---|
| 6,704,431 B1 * | 3/2004 | Ogawa et al. | ............... | 382/100 |
| 6,741,739 B1 * | 5/2004 | Vincent | ...................... | 382/191 |
| 6,801,339 B1 * | 10/2004 | Ito | ............................ | 358/3.26 |
| 6,823,090 B2 * | 11/2004 | Matsuura | .................... | 382/275 |
| 6,975,753 B2 * | 12/2005 | Matsuura et al. | ............ | 382/132 |
| 6,985,632 B2 * | 1/2006 | Sato et al. | ................... | 382/240 |
| 7,079,700 B2 * | 7/2006 | Shinbata | .................... | 382/254 |

OTHER PUBLICATIONS

Mallat, S. and W. L. Hwang, "Singularity Detection and Processing with Wavelets," IEEE Transactions on Information Theory, vol. 38, No. 2, Mar. 1992, pp. 617-643.

Mallat, S., "A Wavelet Tour of Signal Processing" Second Edition, Academic Press, 1998, pp. 148-157 and 254-269.

\* cited by examiner

METHOD AND APPARATUS FOR PROCESSING IMAGE SIGNALS BY APPLYING A MULTI-RESOLUTION CONVERSION PROCESSING FOR REDUCING THE IMAGE SIZE AND APPLYING A DYADIC WAVELET TRANSFORM

BACKGROUND OF THE INVENTION

The present invention relates to method and apparatus for processing image signals, program for the same and image-recording apparatus.

In recent years, when conducting the development or the printing operation for a photographic image, the image formed on the color film has been converted to the image signals by photo-electronically reading the image with the CCD (Charge Coupled Device) sensor, etc. Various kinds of image processing, represented by the negative/positive inversion processing, the luminance adjustment processing, the color balance adjustment processing, the granularity eliminating processing and the sharpness enhancing processing, are applied to such the image signals, and then, the processed image signals are distributed to the viewers by means of the storage medium, such as a CD-R, a floppy (Registered Trade Mark) disk, a memory card, etc. or through the Internet. Each of the viewers would view the hard-copy image printed by anyone of an ink-jetting printer, a thermal printer, etc., or the image displayed on one of various kinds of display devices including a CRT (Cathode Ray Tube), a liquid-crystal display device, a plasma display device, etc., based on the distributed image signals.

Generally speaking, the image on the color film is formed by gathering dye-clouds having various sizes. Accordingly, when the image formed on the color film is enlarged for observation, mottled granular irregularity becomes visible corresponding to the sizes of dye-clouds, at an area where a color pattern should be inherently uniform. Owing to this fact, the image signals, acquired by photo-electronically reading the image formed on a photographic film with the CCD sensor or the like, includes granular noises corresponding to the mottled granular irregularity. It has bee a problem that the abovementioned granular noises considerably increase, especially associated with the image processing for enhancing the sharpness of the image, and deteriorate the image quality.

In recent years, a less costly digital still camera (hereinafter abbreviated as "DSC") has come into widespread use. The DSC incorporated in such equipment as a cellular phone and laptop PC is also extensively used. The image sensor used in a less-costly DSC is characterized by a small pixel pitch. Shot noise tends to be produced at a low sensitivity, and not much consideration is given to cooling of an image sensor, so that conspicuous dark current noise is produced. The CMOS image sensor is often adopted in the less-costly DSC, so leakage current noise is conspicuous. When such noise is further subjected to image processing of interpolation of color filter arrangement and edge enhancement, the mottled granular irregularities are formed to deteriorate image quality. This has raised a problem (for DSC noise and interpolation of color film arrangement, refer to, for instance, "Digital Photography" Chapter 2 and 3, published by The Society of Photographic Science and Technology of Japan, Corona Publishing Co., Ltd.).

Further, the low-pass filter median filter technique has been well-known as a method for solving the abovementioned problem (for instance, refer to "Practical Image Processing learnt in C-language" P54, by Inoue et al., Ohm Publishing Co., Ltd.). However, noise removal by simple filtering involves reduced image sharpness, and a satisfactory image cannot be obtained.

To solve the abovementioned problems, application of an image processing employing the Dyadic Wavelet transform, which is capable of accurately eliminating various kinds of noises, could be possibly considered (for instance, refer to Non-Patent Document 1). The image processing employing the Dyadic Wavelet transform has bee used for, for instance, the sharpness change of the image, the contrast change of the image, etc.

Non-Patent Document 1: "Singularity detection and processing with wavelets" by S. Mallat and W. L. Hwang, IEEE Trans. Inform. Theory 38 617 (1992)

There has been a problem, however, that the processing velocity becomes slow in the abovementioned image processing employing the Dyadic Wavelet transform, since the processing load would be getting heavy according as increase of its conversion levels and the image size of the image signals (namely, increase of the pixels, increase of data amount of the image signals). In other words, since the Dyadic Wavelet transform of a single level decomposes the original image into three different images including an image of low frequency band component, an image of high frequency band component in the direction of "x" and an image of high frequency band component in the direction of "y", each of which has the same image size as that of the original image, the total image size of the converted images becomes larger than that of the original image, resulting in a heavy processing load.

SUMMARY OF THE INVENTION

To overcome the abovementioned drawbacks in conventional image-processing method and apparatus, it is an object of the present invention to provide image-processing method and apparatus, which make it possible to reduce the processing load even in the image-processing environment employing the Dyadic Wavelet transform.

Accordingly, to overcome the cited shortcomings, the abovementioned object of the present invention can be attained by image-processing methods, image-processing apparatus, image-processing programs and image-recording apparatus, described as follow.

(1) A method for processing image signals, comprising the steps of: reading an image recorded on a recording medium so as to generate image signals representing the image; applying a multi-resolution conversion processing of at least level 1, which is capable of reducing an image size of the image signals, to the image signals read in the reading step, so as to generate first-converted image signals from the image signals; and applying a Dyadic Wavelet transform of at least level 1 to low frequency band component signals included in the first-converted image signals generated in the applying step of the multi-resolution conversion processing, so as to generate second-converted image signals from the first-converted image signals; wherein an image size of the first-converted image signals is smaller than that of the image signals.

(2) The method of item 1, further comprising the step of: applying a first image processing to the second-converted image signals generated in the applying step of the Dyadic Wavelet transform.

(3) The method of item 1, further comprising the step of: applying a first image processing to high frequency band component signals included in the second-converted image signals generated in the applying step of the Dyadic Wavelet transform.

(4) The method of item 3, wherein the first image processing includes such a processing that a signal intensity of a specific pixel, which fulfils a predetermined condition established in advance among pixels represented by the high frequency band component signals, is suppressed in the applying step of the first image processing.

(5) The method of item 2, further comprising the step of: applying a second image processing to the first-converted image signals generated in the applying step of the multi-resolution conversion processing.

(6) The method of item 2, further comprising the step of: applying a second image processing to high frequency band component signals included in the first-converted image signals generated in the applying step of the multi-resolution conversion processing.

(7) The method of item 6, wherein the second image processing includes such a processing that a signal intensity of a specific pixel, which fulfils a predetermined condition established in advance among pixels represented by the high frequency band component signals, is suppressed in the applying step of the second image processing.

(8) The method of item 1, wherein the multi-resolution conversion is an orthogonal wavelet conversion or a bi-orthogonal wavelet conversion.

(9) The method of item 1, further comprising the steps of: determining a changeover level from the multi-resolution conversion processing to the Dyadic Wavelet transform, based on a resolution of the image signals read in the reading step; wherein the multi-resolution conversion processing is applied to the image signals according to the changeover level determined in the determining step, and the Dyadic Wavelet transform is applied to the low frequency band component signals according to the changeover level determined in the determining step.

(10) An apparatus for processing image signals, comprising: a reading section to read an image recorded on a recording medium so as to generate image signals representing the image; a first converting section to apply a multi-resolution conversion processing of at least level 1, which is capable of reducing an image size of the image signals, to the image signals read by the reading section, so as to generate first-converted image signals from the image signals; and a second converting section to apply a Dyadic Wavelet transform of at least level 1 to low frequency band component signals included in the first-converted image signals generated by the first converting section, so as to generate second-converted image signals from the first-converted image signals; wherein an image size of the first-converted image signals is smaller than that of the image signals.

(11) The apparatus of item 10, further comprising: a first image-processing section to apply a first image processing to the second-converted image signals generated by the second converting section.

(12) The apparatus of item 10, further comprising: a first image-processing section to apply a first image processing to high frequency band component signals included in the second-converted image signals generated by the second converting section.

(13) The apparatus of item 12, wherein the first image processing includes such a processing that a signal intensity of a specific pixel, which fulfils a predetermined condition established in advance among pixels represented by the high frequency band component signals, is suppressed.

(14) The apparatus of item 11, further comprising: a second image-processing section to apply a second image processing to the first-converted image signals generated by the first converting section.

(15) The apparatus of item 11, further comprising: a second image-processing section to apply a second image processing to high frequency band component signals included in the first-converted image signals generated by the first converting section.

(16) The apparatus of item 15, wherein the second image processing includes such a processing that a signal intensity of a specific pixel, which fulfils a predetermined condition established in advance among pixels represented by the high frequency band component signals, is suppressed.

(17) The apparatus of item 10, wherein the multi-resolution conversion is an orthogonal wavelet conversion or a bi-orthogonal wavelet conversion.

(18) The apparatus of item 10, further comprising: a determining section to determine a changeover level from the multi-resolution conversion processing to the Dyadic Wavelet transform, based on a resolution of the image signals read by the reading section; wherein the first converting section applies the multi-resolution conversion processing to the image signals according to the changeover level determined by the determining section, and the second converting section applies the Dyadic Wavelet transform to the low frequency band component signals according to the changeover level determined by the determining section.

(19) A computer program for executing operations for processing image signals, comprising the functional steps of: reading an image recorded on a recording medium so as to generate image signals representing the image; applying a multi-resolution conversion processing of at least level 1, which is capable of reducing an image size of the image signals, to the image signals read in the reading step, so as to generate first-converted image signals from the image signals; and applying a Dyadic Wavelet transform of at least level 1 to low frequency band component signals included in the first-converted image signals generated in the applying step of the multi-resolution conversion processing, so as to generate second-converted image signals from the first-converted image signals; wherein an image size of the first-converted image signals is smaller than that of the image signals.

(20) The computer program of item 19, further comprising the functional step of: applying a first image processing to the second-converted image signals generated in the applying step of the Dyadic Wavelet transform.

(21) The computer program of item 19, further comprising the step of: applying a first image processing to high frequency band component signals included in the second-converted image signals generated in the applying step of the Dyadic Wavelet transform.

(22) The computer program of item 21, wherein the first image processing includes such a processing that a signal intensity of a specific pixel, which fulfils a predetermined condition established in advance among pixels represented by the high frequency band component signals, is suppressed in the applying step of the first image processing.

(23) The computer program of item 20, further comprising the functional step of: applying a second image processing to the first-converted image signals generated in the applying step of the multi-resolution conversion processing.

(24) The computer program of item 20, further comprising the functional step of: applying a second image processing to high frequency band component signals included in the first-converted image signals generated in the applying step of the multi-resolution conversion processing.

(25) The computer program of item 24, wherein the second image processing includes such a processing that a signal intensity of a specific pixel, which fulfils a predetermined condition established in advance among pixels represented by the high frequency band component signals, is suppressed in the applying step of the second image processing.

(26) The computer program of item 19, wherein the multi-resolution conversion is an orthogonal wavelet conversion or a bi-orthogonal wavelet conversion.

(27) The computer program of item 19, further comprising the functional steps of: determining a changeover level from the multi-resolution conversion processing to the Dyadic Wavelet transform, based on a resolution of the image signals read in the reading step; wherein the multi-resolution conversion processing is applied to the image signals according to the changeover level determined in the determining step, and the Dyadic Wavelet transform is applied to the low frequency band component signals according to the changeover level determined in the determining step.

(28) An apparatus for recording an output image onto an outputting medium, comprising: a reading section to read an image formed on a recording medium so as to generate image signals representing the image; a processing section to process the image signals so as to generate an output image signals representing the output image; and a recording section to record the output image onto the outputting medium, based on the output image signals generated by the processing section; wherein the processing section includes: a first converting section to apply a multi-resolution conversion processing of at least level 1, which is capable of reducing an image size of the image signals, to the image signals read by the reading section, so as to generate first-converted image signals from the image signals; and a second converting section to apply a Dyadic Wavelet transform of at least level 1 to low frequency band component signals included in the first-converted image signals generated by the first converting section, so as to generate second-converted image signals from the first-converted image signals; wherein an image size of the first-converted image signals is smaller than that of the image signals.

(29) The apparatus of item 28, wherein the processing section further includes: a first image-processing section to apply a first image processing to the second-converted image signals generated by the second converting section.

(30) The apparatus of item 28, wherein the processing section further includes: a first image-processing section to apply a first image processing to high frequency band component signals included in the second-converted image signals generated by the second converting section.

(31) The apparatus of item 30, wherein the first image processing includes such a processing that a signal intensity of a specific pixel, which fulfils a predetermined condition established in advance among pixels represented by the high frequency band component signals, is suppressed.

(32) The apparatus of item 29, wherein the processing section further includes: a second image-processing section to apply a second image processing to the first-converted image signals generated by the first converting section.

(33) The apparatus of item 29, wherein the processing section further includes: a second image-processing section to apply a second image processing to high frequency band component signals included in the first-converted image signals generated by the first converting section.

(34) The apparatus of item 33, wherein the second image processing includes such a processing that a signal intensity of a specific pixel, which fulfils a predetermined condition established in advance among pixels represented by the high frequency band component signals, is suppressed.

(35) The apparatus of item 28, wherein the multi-resolution conversion is an orthogonal wavelet conversion or a bi-orthogonal wavelet conversion.

(36) The apparatus of item 28, wherein the processing section further includes: a determining section to determine a changeover level from the multi-resolution conversion processing to the Dyadic Wavelet transform, based on a resolution of the image signals read by the reading section; wherein the first converting section applies the multi-resolution conversion processing to the image signals according to the changeover level determined by the determining section, and the second converting section applies the Dyadic Wavelet transform to the low frequency band component signals according to the changeover level determined by the determining section.

Further, to overcome the abovementioned problems, other image-processing methods, other image-processing apparatus, other image-processing programs and other image-recording apparatus, embodied in the present invention, will be described as follow:

(37) An image-processing method, characterized by including:

a reading process for reading an image signals recorded on a recording medium;

a first converting process for applying a multi-resolution conversion processing of at least level 1, the method of which reduces an image size, to the image signals read in the reading process;

a second converting process for applying a Dyadic Wavelet transform of at least level 1 to low frequency band component signals included in the image signals to which the multi-resolution conversion processing is applied in the first converting process; and an image-processing process for conducting a predetermined image-processing to the image signals to which the multi-resolution conversion processing is applied in the first converting process and the image signals to which the Dyadic Wavelet transform is applied in the second converting process.

(38) An image-processing apparatus, characterized in that, the image-processing apparatus is provided with, a image-signal reading section to read an image signals recorded on a recording medium;

a first converting section to apply a multi-resolution conversion processing of at least level 1, the method of which reduces an image size, to the image signals read by the reading section;

a second converting section to apply a Dyadic Wavelet transform of at least level 1 to low frequency band component signals included in the image signals to which the multi-resolution conversion processing is applied by the first converting section; and an image-processing section to conduct a predetermined image-processing to the image signals to which the multi-resolution conversion processing is applied by the first converting section and the image signals to which the Dyadic Wavelet transform is applied by the second converting section.

(39) An image-processing program for computer, which conducts image processing, to realize the functions of:

a image-signal reading function for reading an image signals recorded on a recording medium;

a first converting function for applying a multi-resolution conversion processing of at least level 1, the method of which reduces an image size, to the image signals read by the image-signal reading function;

a second converting function for applying a Dyadic Wavelet transform of at least level 1 to low frequency band component signals included in the image signals to which the multi-resolution conversion processing is applied by the first converting function; and an image-processing function for conducting a predetermined image-processing to the image signals to which the multi-resolution conversion processing is applied by the first converting function and the image signals to which the Dyadic Wavelet transform is applied by the second converting function.

(40) An image-recording apparatus, characterized in that, the image-recording apparatus is provided with, a image-signal reading section to read an image signals recorded on a recording medium;

a first converting section to apply a multi-resolution conversion processing of at least level 1, the method of which reduces an image size, to the image signals read by the reading section;

a second converting section to apply a Dyadic Wavelet transform of at least level 1 to low frequency band component signals included in the image signals to which the multi-resolution conversion processing is applied by the first converting section;

an image-processing section to conduct a predetermined image-processing to the image signals to which the multi-resolution conversion processing is applied by the first converting section and the image signals to which the Dyadic Wavelet transform is applied by the second converting section; and an image-recording section to record an image onto an outputting medium by outputting the image signals, image-processing for which is conducted by the image-processing section.

According to the invention, described in anyone of items 1, 10, 19, 28 and 37-40, since the multi-resolution conversion processing for reducing the image size is applied to the image signals read from the original image, and then, the Dyadic Wavelet transform is applied, so as to apply the image processing, it becomes possible to reduce the processing load without causing a deterioration of the image quality.

(41) The image-processing method, described in item 37, characterized in that, in the image-processing process, the predetermined image-processing is applied to the image signals of a high frequency band component, among the image signals to which the multi-resolution conversion processing is applied and the image signals to which the Dyadic Wavelet transform is applied.

(42) The image-processing apparatus, described in item 38, characterized in that, the image-processing section applies the predetermined image-processing to the image signals of a high frequency band component, among the image signals to which the multi-resolution conversion processing is applied and the image signals to which the Dyadic Wavelet transform is applied.

(43) The image-processing program, described in item 39, characterized in that, when realizing the image-processing function, the predetermined image-processing is applied to the image signals of a high frequency band component, among the image signals to which the multi-resolution conversion processing is applied and the image signals to which the Dyadic Wavelet transform is applied.

(44) The image-recording apparatus, described in item 40, characterized in that, the image-processing section applies the predetermined image-processing to the image signals of a high frequency band component, among the image signals to which the multi-resolution conversion processing is applied and the image signals to which the Dyadic Wavelet transform is applied.

According to the invention, described in anyone of items 3, 6, 12, 15, 21, 24, 30, 33 and 41-44, since the image-processing is applied to high frequency band component signals, among image signals to which the multi-resolution conversion processing and the Dyadic Wavelet transform are applied, it becomes possible to effectively eliminate the granular noises.

(45) The image-processing method, described in item 41, characterized in that, in the image-processing process, a processing for suppressing a signal intensity is conducted in regard to a pixel, which fulfils a predetermined condition established in advance in respect to the signal intensity, among the image signals of the high frequency band component.

(46) The image-processing apparatus, described in item 42, characterized in that, the image-processing section conducts a processing for suppressing a signal intensity in regard to a pixel, which fulfils a predetermined condition established in advance in respect to the signal intensity, among the image signals of the high frequency band component.

(47) The image-processing method, described in item 43, characterized in that, when realizing the image-processing function, a processing for suppressing a signal intensity is conducted in regard to a pixel, which fulfils a predetermined condition established in advance in respect to the signal intensity, among the image signals of the high frequency band component.

(48) The image-recording apparatus, described in item 44, characterized in that, the image-recording section conducts a processing for suppressing a signal intensity in regard to a pixel, which fulfils a predetermined condition established in advance in respect to the signal intensity, among the image signals of the high frequency band component.

According to the invention, described in anyone of items 4, 7, 13, 16, 22, 25, 31, 34 and 45-48, since the processing for suppressing the signal intensity is applied to the pixel, which fulfils a predetermined condition established in advance, and the signal intensities of other pixels are kept as they are, it becomes possible to eliminate granular noises in a further desirable manner and to obtain a natural image without generating artifacts and without giving a sense of incongruity to the viewer.

(49) The image-processing method, described in anyone of items 37, 41 and 45, characterized in that, the image-processing method includes a determining process for determining a changeover level from the multi-resolution conversion processing to the Dyadic Wavelet transform, based on a reading resolution of the image signals in the reading process, and the multi-resolution conversion processing is conducted according to the changeover level determined by the determining process in the first converting process, and the Dyadic Wavelet transform is conducted according to the changeover level determined by the determining process in the second converting process.

(50) The image-processing apparatus, described in anyone of items 38, 42 and 46, characterized in that, the image-processing apparatus is provided with a determining section to determine a changeover level from the multi-resolution conversion processing to the Dyadic Wavelet transform, based on a reading resolution of the image signals by the image-signal reading process, and the first converting section conducts the multi-resolution conversion processing, according to the changeover level determined by the determining section, and the second converting section conducts the Dyadic Wavelet transform, according to the changeover level determined by the determining section.

(51) The image-processing program, described in anyone of items 39, 43 and 47, characterized in that, the image-processing program realizes a determining function for determining a changeover level from the multi-resolution conversion processing to the Dyadic Wavelet transform, based on a reading resolution of the image signals by the reading function, and the multi-resolution conversion processing is conducted according to the changeover level determined by the determining function when realizing the first converting function, and the Dyadic Wavelet transform is conducted according to the changeover level determined by the determining function when realizing the second converting function.

(52) The image-recording apparatus, described in anyone of items 40, 44 and 48, characterized in that, the image-recording apparatus is provided with a determining section to determine a changeover level from the multi-resolution conversion processing to the Dyadic Wavelet transform, based on a reading resolution of the image signals by the image-signal reading process, and the first converting section conducts the multi-resolution conversion processing, according to the changeover level determined by the determining section, and the second converting section conducts the Dyadic Wavelet transform, according to the changeover level determined by the determining section.

According to the invention, described in anyone of items 9, 18, 27, 36 and 49-52, since the changeover level from the multi-resolution conversion processing, which reduces the image size, to the Dyadic Wavelet transform is determined on the basis of the resolution for reading the image signals, it becomes possible to reduce the processing load in a most effective manner without causing a deterioration of the image quality.

Next, the terms, employed in the present invention, will be detailed in the following.

The term "image size" in the descriptions in the present specification means a number of pixels represented by the image signals, which are converted from an image formed on a color film or the like by photo-electronically reading the image with a CCD sensor, etc.

Further, the "multiple resolution conversion" is a generic name of the methods represented by the wavelet conversion, the full-restructuring filter bank, the Laplacian pyramid, etc. In this method, one converting operation allows the inputted signals to be decomposed into high-frequency component signals and low-frequency component signals, and then, a same kind of converting operation is further applied to the acquired low-frequency component signals, in order to obtain the multiple resolution signals including a plurality of signals locating in frequency bands being different relative to each other. The multiple resolution signals can be restructured to the original signals by applying the multiple resolution inverse-conversion to the multiple resolution signals as it is without adding any modification to them. The detailed explanations of such methods are set forth in, for instance, "Wavelet and Filter banks" by G. Strang & T. Nguyen, Wellesley-Cambridge Press.

As a representative example of the multi-resolution conversion, the Dyadic Wavelet transform will be summarized in the following. The wavelet transform is operated as follows: In the first place, the following wavelet function shown in equation (1), where vibration is observed in a finite range as shown in FIG. 1, is used to obtain the wavelet transform coefficient $<f, \psi_{a,b}>$ with respect to input signal f(x) by employing equation (2). Through this process, input signal is converted into the sum total of the wavelet function shown in equation (3).

$$\psi_{a,b}(x) = \psi\left(\frac{x-b}{a}\right) \tag{1}$$

$$\langle f, \psi_{a,b} \rangle \equiv \frac{1}{a}\int f(x) \cdot \psi\left(\frac{x-b}{a}\right) dx \tag{2}$$

$$f(x) = \sum_{a,b} \langle f, \psi_{a,b} \rangle \cdot \psi_{a,b}(x) \tag{3}$$

In the above equations (1)-(3), "a" denotes the scale of the wavelet function, and "b" the position of the wavelet function. As shown in FIG. 1, as the value "a" is greater, the frequency of the wavelet function $\psi_{a,b}(x)$ is smaller. The position where the wavelet function $\psi_{a,b}(x)$ vibrates moves according to the value of position "b". Thus, equation (3) signifies that the input signal f(x) is decomposed into the sum total of the wavelet function $\psi_{a,b}(x)$ having various scales and positions.

Among such the wavelet transform, the orthogonal wavelet conversion and the bi-orthogonal wavelet conversion have been specifically well known as the "multi-resolution conversion method, which reduces the image size", described in the present invention. The orthogonal wavelet conversion and the bi-orthogonal wavelet conversion will be summarized in the following.

The wavelet function in the orthogonal wavelet conversion and the bi-orthogonal wavelet conversion is defined by equation (4) shown in the following.

$$\psi_{i,j}(x) = 2^{-i}\psi\left(\frac{x - j \cdot 2^i}{2^i}\right) \tag{4}$$

where "i" denotes a natural number.

Comparison between equation (4) and equation (1) shows that the value of scale "a" is defined discretely by an i-th power of "2", in the orthogonal wavelet conversion and the bi-orthogonal wavelet conversion. This value "i" is called a level.

In practical terms, level "i" is restricted up to finite upper limit N, and input signal f(x) is expressed as shown in equation (5), equation (6) and equation (7).

$$f(x) \equiv S_0 = \sum_j \langle S_0, \psi_{1,j} \rangle \cdot \psi_{1,j}(x) + \sum_j \langle S_0, \phi_{1,j} \rangle \cdot \phi_{1,j}(x) \quad (5)$$

$$\equiv \sum_j W_1(j) \cdot \psi_{1,j}(x) + \sum_j S_1(j) \cdot \phi_{1,j}(x)$$

$$S_{i-1} = \sum_j \langle S_{i-1}, \psi_{i,j} \rangle \cdot \psi_{i,j}(x) + \sum_j \langle S_{i-1}, \phi_{i,j} \rangle \cdot \phi_{i,j}(x) \quad (6)$$

$$\equiv \sum_j W_i(j) \cdot \psi_{i,j}(x) + \sum_j S_i(j) \cdot \phi_{i,j}(x)$$

$$f(x) \equiv S_0 = \sum_{i=1}^N \sum_j W_i(j) \cdot \psi_{i,j}(x) + \sum_j S_N(j) \cdot \phi_{i,j}(x) \quad (7)$$

The second term of equation (5) denotes that the low frequency band component of the residue that cannot be represented by the sum total of wavelet function $\psi_{1,j}(x)$ of level 1 is represented in terms of the sum total of scaling function $\phi_{1,j}(x)$. An adequate scaling function in response to the wavelet function is employed (refer to the aforementioned reference). This means that input signal $f(x) \equiv S_0$ is decomposed into the high frequency band component $W_1$ and low frequency band component $S_i$ of level 1 by the wavelet transform of level 1 shown in equation (5).

Since the minimum traveling unit of the wavelet function $\psi_{i,j}(x)$ is $2^i$, each of the signal volume of high frequency band component $W_1$ and low frequency band component $S_1$ with respect to the signal volume of input signal "$S_0$" is $\frac{1}{2}$. The sum total of the signal volumes of high frequency band component $W_1$ and low frequency band component $S_1$ is equal to the signal volume of input signal "$S_0$". The low frequency band component $S_1$, obtained by the wavelet transform of level 1, is decomposed into high frequency band component $W_2$ and low frequency band component $S_2$ of level 2 by equation (6). After that, transform is repeated up to level N, whereby input signal "$S_0$" is decomposed into the sum total of the high frequency band components of levels 1 through N and the sum of the low frequency band components of level N, as shown in equation (7).

Incidentally, it has been well known that the wavelet transform of level 1, shown in equation (6), can be computed by the filtering process, which employs low-pass filter LPF and high-pass filter HPF as shown in FIG. 2. In FIG. 2, LPF denotes a low-pass filter, while HPF denotes a high-pass filter. The filter coefficients of low-pass filter LPF and high-pass filter HPF are appropriately determined corresponding to the wavelet function (refer to the aforementioned reference document). In FIG. 2, symbol 2↓ shows the down sampling where every other samples are removed.

As shown in FIG. 2, input signal "$S_{n-1}$" can be decomposed into the high frequency band component $W_n$ and the low frequency band component $S_n$, by processing input signal "$S_{n-1}$" with low-pass filter LPF and high-pass filter HPF, and by thinning out signals at every other samples.

The wavelet transform of level 1 for the two-dimensional signals, such as the image signals, is conducted in the filtering process as shown in FIG. 3. In FIG. 3, the suffix "x", subscripted as $LPF_x$, $HPF_x$ and $2\downarrow_x$, indicates the processing in the direction of "x", while the suffix "y", subscripted as $LPF_y$, $HPF_y$ and $2\downarrow_y$, indicates the processing in the direction of "y". Initially, the filter processing is applied to input signal $S_{n-1}$ by means of low-pass filter LPF, and high-pass filter $HPF_x$ in the direction of "x", and then, the down sampling is conducted in the direction of "x". By conducting such the processing, input signal $S_{n-1}$ is decomposed into low frequency band component $SX_n$ and high frequency band component $WX_n$. Further, the filter processing is applied to low frequency band component $SX_n$ and high frequency band component $WX_n$ by means of low-pass filter $LPF_y$ and high-pass filter $HPF_y$ in the direction of "y", and then, the down sampling is conducted in the direction of "y".

According to the wavelet transform of level 1, input signal $S_{n-1}$ can be decomposed into three high frequency band components $Wv_n$, $Wh_n$, $Wd_n$ and one low frequency band component $S_n$. Since each of the signal volumes of $Wv_n$, $Wh_n$, $Wd_n$ and $S_n$, generated by a single wavelet transform operation, is ½ of that of the input signal $S_{n-1}$ prior to decomposition in both vertical and horizontal directions, the total sum of signal volumes of four components subsequent to decomposition is equal to the signal $S_{n-1}$ prior to decomposition.

FIG. 4 shows the type process of decomposing input signal "$S_0$" by means of the wavelet transform of level 1, level 2 and level 3. As the level number "i" increases, the image signal is further thinned out by the down sampling operation, and the decomposed image is getting small.

Further, it has been well known that, by applying the wavelet inverse transform, which would be calculated in the filtering process, or the like, to $Wv_n$, $Wh_n$, $Wd_n$ and $S_n$ generated by decomposition processing, the signal $S_{n-1}$ prior to decomposition can be fully reconstructed as shown in FIG. 5. Incidentally, in FIG. 5, LPF' indicates a low-pass filter for inverse transform, while HPF' indicates a high-pass filter for inverse transform. Further, 2↑ denotes the up-sampling where zero is inserted into every other signals. Still further, the suffix "x", subscripted as $LPF'_x$, $HPF'_x$ and $2\uparrow_x$, indicates the processing in the direction of "x", while the suffix "y", subscripted as $LPF'_y$, $HPF'_y$ and $2\uparrow_y$, indicates the processing in the direction of "y".

As shown in FIG. 5, low frequency band component $SX_n$ can be obtained by adding a signal, which is acquired by up-sampling $S_n$ in the direction of "y" and processing with low-pass filter $LPF'_y$ in the direction of "y", and another signal, which is acquired by up-sampling $Wh_n$ in the direction of "y" and processing with high-pass filter $HPF'_y$ in the direction of "y", to each other. As well as the above process, $WX_n$ is generated from $Wv_n$ and $Wd_n$.

Further, the signal $S_{n-1}$ prior to decomposition can be reconstructed by adding a signal, which is acquired by up-sampling $SX_n$ in the direction of "x" and processing with low-pass filter $LPF'_x$ in the direction of "x", and another signal, which is acquired by up-sampling $WX_n$ in the direction of "x" and processing with high-pass filter $HPF'_x$ in the direction of "x", to each other.

In case of the orthogonal wavelet conversion, the coefficient of the filter employed for the inverse transforming operation is the same as that of the filter employed for the transforming operation. On the other hand, in case of the bi-orthogonal wavelet conversion, the coefficient of the filter employed for the inverse transforming operation is different from that of the filter employed for the transforming operation (refer to the aforementioned reference document).

The detailed explanations for the Dyadic Wavelet transform employed in the present invention are set forth in the aforementioned non-Patent Document, "Characterization of signal from multiscale edges" by S. Mallet and S. Zhong, IEEE Trans. Pattern Anal. Machine Intel. 14 710 (1992), and "A wavelet tour of signal processing 2ed." by S. Mallat, Academic Press. The Dyadic Wavelet transform will be summarized in the following.

The wavelet function employed in the Dyadic Wavelet transform is defined by equation (8) shown below.

$$\psi_{i,j}(x) = 2^{-i}\psi\left(\frac{x-j}{2^i}\right) \quad (8)$$

where "i" denotes a natural number.

As aforementioned, the Wavelet functions of the orthogonal wavelet transform and the bi-orthogonal wavelet transform are discretely defined when the minimum traveling unit of the position on level "i" is $2^i$, as described above. By contrast, in the Dyadic Wavelet transform, the minimum traveling unit of the position is kept constant, regardless of level "i". This difference brings the following characteristics to the Dyadic Wavelet transform.

Characteristic 1: The signal volume of each of high frequency band component $W_i$ and low frequency band component $S_i$ generated by the Dyadic Wavelet transform of level 1 shown by equation (9) is the same as that of signal $S_{i-1}$ prior to transform.

$$S_{i-1} = \sum_j \langle S_{i-1}, \psi_{i,j}\rangle \cdot \psi_{i,j}(x) + \sum_j \langle S_{i-1}, \phi_{i,j}\rangle \cdot \phi_{i,j}(x) \quad (9)$$

$$\equiv \sum_j W_i(j) \cdot \psi_{i,j}(x) + \sum_j S_i(j) \cdot \phi_{i,j}(x)$$

Accordingly, unlike the orthogonal wavelet transform and the bi-orthogonal wavelet transform, the image size after applying the Dyadic Wavelet transform is not reduced, compared to the original image size.

Characteristic 2: The scaling function $\phi_{i,j}(x)$ and the wavelet function $\psi_{i,j}(x)$ fulfill the following relationship shown by equation (10).

$$\psi_{i,j}(x) = \frac{\partial}{\partial x}\phi_{i,j}(x) \quad (10)$$

Thus, the high frequency band component $W_i$ generated by the Dyadic Wavelet transform of level 1 represents the first differential (gradient) of the low frequency band component $S_i$.

Characteristic 3: With respect to $W_i \cdot \gamma_i$ (hereinafter referred to as "compensated high frequency band component) obtained by multiplying the coefficient $\gamma_i$ (refer to the aforementioned reference documents in regard to the Dyadic Wavelet transform) determined in response to the level "i" of the Wavelet transform, by high frequency band component, the relationship between levels of the signal intensities of compensated high frequency band components $W_i \cdot \gamma_i$ subsequent to the above-mentioned transform obeys a certain rule, in response to the singularity of the changes of input signals, as described in the following.

FIG. 6 shows exemplified waveforms of input signal "$S_0$" and compensated high frequency band components acquired by the Dyadic Wavelet transform of every level.

Namely, FIG. 6 shows exemplified waveforms of: input signal "$S_0$" at line (a); compensated high frequency band component $W_1 \cdot \gamma_1$, acquired by the Dyadic Wavelet transform of level 1, at line (b); compensated high frequency band component $W_2 \cdot \gamma_2$, acquired by the Dyadic Wavelet transform of level 2, at line (c); compensated high frequency band component $W_3 \cdot \gamma_3$, acquired by the Dyadic Wavelet transform of level 3, at line (d); and compensated high frequency band component $W_4 \cdot \gamma_4$, acquired by the Dyadic Wavelet transform of level 4, at line (e).

Observing the changes of the signal intensities step by step, the signal intensity of the compensated high frequency band component $W_i \cdot \gamma_i$, corresponding to a gradual change of the signal intensity shown at "1" and "4" of line (a), increases according as the level number "i" increases, as shown in line (b) through line (e).

With respect to input signal "$S_0$", the signal intensity of the compensated high frequency band component $W_i \cdot \gamma_i$, corresponding to a stepwise signal change shown at "2" of line (a), is kept constant irrespective of the level number "i". Further, with respect to input signal "$S_0$", the signal intensity of the compensated high frequency band component $W_i \cdot \gamma_i$, corresponding to a signal change of δ-function shown at "3" of line (a), decreases according as the level number "i" increases, as shown in line (b) through line (e).

Characteristic 4: Unlike the above-mentioned method of the orthogonal wavelet transform and the bi-orthogonal wavelet transform, the method of Dyadic Wavelet transform of level 1 in respect to the two-dimensional signals such as the image signals is followed as shown in FIG. 7.

As shown in FIG. 7, in the Dyadic Wavelet transform of level 1, low frequency band component $S_n$ can be acquired by processing input signal $S_{n-1}$ with low-pass filter $LPF_x$ in the direction of "x" and low-pass filter $LPF_y$ in the direction of "y". Further, a high frequency band component $Wx_n$ can be acquired by processing input signal $S_{n-1}$ with high-pass filter $HPF_x$ in the direction of "x", while another high frequency band component $Wy_n$ can be acquired by processing input signal $S_{n-1}$ with high-pass filter $HPF_y$ in the direction of "y".

The low frequency band component $S_{n-1}$ is decomposed into two high frequency band components $Wx_n$, $Wy_n$ and one low frequency band component $S_n$ by the Dyadic Wavelet transform of level 1. Two high frequency band components correspond to components x and y of the change vector $V_n$ in the two dimensions of the low frequency band component $S_n$. The magnitude $M_n$ of the change vector $V_n$ and angle of deflection $A_n$ are given by equation (11) and equation (12) shown as follow.

$$M_n = \sqrt{Wx_n^2 + Wy_n^2} \quad (11)$$

$$A_n = \text{argument }(Wx_n + iWy_n) \quad (12)$$

$S_{n-1}$ prior to transform can be reconfigured when the Dyadic Wavelet inverse transform shown in FIG. 8 is applied to two high frequency band components $Wx_n$, $Wy_n$ and one low frequency band component $S_n$. In other words, input signal $S_{n-1}$ prior to transform can be reconstructed by adding the signals of: the signal acquired by processing low frequency band component $S_n$ with low-pass filters $LPF'_x$ and $LPF'_y$, both used for the forward transform in the directions of "x" and "y"; the signal acquired by processing high frequency band component $Wx_n$ with high-pass filter $HPF'_x$ in the direction of "x" and low-pass filter $LPF'_y$ in the direction of "y"; and the signal acquired by processing high frequency band component $Wy_n$ with low-pass filter $LPF'_x$ in the direction of "x" and high-pass filter $HPF'_y$ in the direction of "y"; together.

Next, referring to FIG. 9, the method for acquiring output signals $S_0'$, having the steps of applying the Dyadic Wavelet transform of level "n" to input signals "$S_0$", applying a certain kind of image-processing (referred to as "editing" in FIG. 9) to the acquired high frequency band components and the acquired low frequency band component, and then, conducting the Dyadic Wavelet inverse-transform to acquire output signals $S_0'$, will be detailed in the following.

In the Dyadic Wavelet transform of level 1 for input signal "$S_0$", input signal "$S_0$" is decomposed into two high frequency band components $Wx_1$, $Wy_1$ and low frequency band component $S_1$. In the Dyadic Wavelet transform of level 2, low frequency band component $S_1$ is further decomposed into two high frequency band components $Wx_2$, $Wy_2$ and low frequency band component $S_2$. By repeating the abovementioned operational processing up to level "n", input signal "$S_0$" is decomposed into a plurality of high frequency band components $Wx_1$, $Wx_2$, - - - $Wx_n$, $Wy_1$, $Wy_2$, - - - $Wy_n$ and a single low frequency band component $S_n$.

The image-processing (the editing operations) are applied to high frequency band components $Wx_1$, $Wx_2$, - - - $Wx_n$, $Wy_1$, $Wy_2$, - - - $Wy_n$ and low frequency band component $S_n$ generated through the abovementioned processes to acquire edited high frequency band components $Wx_1'$, $Wx_2'$, - - - $Wx_n'$, $Wy_1'$, $Wy_2'$, - - - $Wy_n'$ and edited low frequency band component $S_n'$.

Then, the Dyadic Wavelet inverse-transform is applied to edited high frequency band components $Wx_1'$, $Wx_2'$, - - - $Wx_n'$, $Wy_1'$, $Wy_2'$, - - - $Wy_n'$ and edited low frequency band component $S_n'$. Specifically speaking, the edited low frequency band component $S_{n-1}'$ of level (n-1) is restructured from the two edited high frequency band components $Wx_n'$, $Wy_n'$ of level "n" and the edited low frequency band component $S_n'$ of level N. By repeating this operation shown in FIG. 9, the edited low frequency band component $S_1'$ of level 1 is restructured from the two edited high frequency band components $Wx_2'$, $Wy_2'$ of level 2 and the edited low frequency band component $S_2'$ of level 2. Successively, the edited low frequency band component $S_0'$ is restructured from the two edited high frequency band components $Wx_1'$, $Wy_1'$ of level 1 and the edited low frequency band component $S_1'$ of level 1.

The filter coefficients of the filters, employed for the operations shown in FIG. 9, are appropriately determined corresponding to the wavelet functions. Further, in the Dyadic Wavelet transform, the filter coefficients, employed for every level number, are different relative to each other. The filtering coefficients employed for level "n" are created by inserting $2^{n-1}-1$ zeros into each interval between filtering coefficients for level 1. The abovementioned procedure is set forth in the aforementioned reference document.

Further, although only an example of applying the image processing (the editing operation) to the high frequency band components and the low frequency band component, which are finally acquired through the process of the Dyadic Wavelet transform, is shown in FIG. 9, it is also applicable that the image processing (the editing operation) is applied to the synthesized image signals of the low frequency band component after applying the Dyadic Wavelet transform, as needed. Further, it is still applicable that the image processing (the editing operation) is applied to the image signals of the low frequency band component, which are in mid-course of the Dyadic Wavelet transform operation.

Since the granular unevenness or noises, residing on the image recorded on the color film or captured by the digital still camera of general use, exhibit its strongest intensity at a level equal to or more than level 2 of the Dyadic Wavelet transform, it is important to apply the Dyadic Wavelet transform at level 2 or more high level in order to accurately and effectively eliminate the granular unevenness or noises. Accordingly, in the present invention, the multi-resolution conversion method, which yields an image having a reduced image size compared to its original image size, is employed for the conversion processing of at least level 1, while the Dyadic Wavelet transform is applied for the conversion processing at level 2 or more high level, to apply the image processing to the converted image signals.

Further, it is desirable that the orthogonal wavelet transform or the bi-orthogonal wavelet transform is employed as the "multi-resolution conversion method, which yields an image having a reduced image size" in the present invention. Since the orthogonal wavelet transform or the bi-orthogonal wavelet transform has an excellent capability for eliminating the granular noises, it is possible to eliminate a little noises residing in, for instance, the image of level 1. Still further, since the orthogonal wavelet transform or the bi-orthogonal wavelet transform makes it possible to reduce the image size of the converted image of the low frequency band component to ¼ of its original image size, such the possibility is desirable in the processing load point of view.

With respect to the invention described in anyone of items 3, 6, 12, 15, 21, 24, 30, 33 and 41-44, the reason why the image-processing is applied to high frequency band component signals, among image signals to which the multi-resolution conversion processing, which reduces the image size, and the Dyadic Wavelet transform are applied, lies on the fact that the granular noises and unevenness are conspicuously observed in an image of the high frequency band components.

With respect to the invention described in anyone of items 4, 7, 13, 16, 22, 25, 31, 34 and 45-48, the "processing for suppressing the signal intensity" is to process the signal intensity of the concerned pixel so as to lower its absolute value.

Further, with respect to the invention described in anyone of items 4, 7, 13, 16, 22, 25, 31, 34 and 45-48, for instance, one of the following methods can be cited as a method for selecting the pixel "which fulfils a predetermined condition established in advance" (hereinafter, referred to as the specific pixel).

(1) A selecting method employing a threshold value determined on the basis of standard value a of signal intensities of high frequency band component signals would be available. According to this method, when the signal intensity of the high frequency band component signal of the specific pixel is smaller than the threshold value, its signal intensity is suppressed. For this purpose, it is desirable that the threshold value, serving as a reference for the selection, is set at a value approximately in a range of $(\sigma \times 0.6)$-$(\sigma \times 1.5)$. In this case, it is applicable that the signal intensity is suppressed at a constant amount or a constant rate, and it is also applicable to increase a suppression amount or a suppression rate according as the signal intensity decreases toward smaller value than the threshold value.

(2) A selecting method employing a threshold value, determined by using an average value, a median, a mode, etc. of the signal intensities, would be available.

(3) As a method to be applied for the Dyadic Wavelet transform, a selecting method, based on a comparison between a compensated high frequency band component image acquired by the Dyadic Wavelet transform of level P and a signal intensity of a corresponding pixel of a compensated high frequency band component image of level (P+1) or level (P-1), would be available. Incidentally, the compensated high frequency band component can be obtained by multiplying the high frequency band component by a coefficient $\gamma_i$ determined corresponding to the conversion level "i" of the Dyadic Wavelet transform as aforementioned.

Further, it is applicable that the sharpness enhancing operation is applied to the high frequency band component signals, after the suppression processing of the signal intensity of the specific pixel is conducted. Incidentally, the method of adding edge components extracted by employing a high-pass filter, such as a Laplacian filter, a Sobel filter, a Hyukel filter, etc., as public knowledge, to the image signals restructured by the Dyadic Wavelet inverse-transform and the multi-resolution inverse-conversion after the suppression processing is completed and the sharpness enhancing technical method employing the unsharp mask could be applied for the sharpness enhancing operation. The detailed explanations of such the sharpness enhancing technical methods are set forth in, for instance, "Practical image processing learnt in C-language" (by M. Inoue, N. Yagi, M Hayashi, H. Nakasu, K. Mitani, M. Okui, Ohm Publishing Co., Ltd.), etc., as public knowledge. By enhancing (or increasing) the signal intensities of the high frequency band components, to which the suppression processing has not applied, the sharpness enhancing operation can be achieved without deteriorating the granular noises, as an especially desirable sharpness-enhancing operation.

Still further, in case of implementing the present invention for image signals of a color image, it is desirable that the image signals are converted into luminance signals and chrominance signals to apply the multi-resolution conversion processing, which reduces the image size of the original image, and the Dyadic Wavelet transform to both the luminance signals and chrominance signals. The term of "to convert the image signals into luminance signals and chrominance signals" is to convert the image signals to those of YIQ base, HSV base, YUV base, etc. or to convert the image signals to those of XYZ base of CIE1931 color system, L*a*b base, L*u*v base recommended by CIE1976, based on sRGB or NTSC standard (those are well-known for a person skilled in the art). Further, the conversion method, in which the average values of R, G, B signals are established as the luminance signals, while two axes orthogonal to the luminance signals are established as the chrominance signals, would be also applicable, as set forth in, for instance, the embodiment of Tokkaisho 63-26783.

With respect to the invention described in anyone of items 9, 18, 27, 36 and 49-52, the term of the "resolution" for reading the image signals denotes a number of pixels included in the image at the time of capturing with a digital still camera, or a number of pixels included in the image at the time of scanning a photographic film.

Further, the reason why the changeover level from the multi-resolution conversion processing, which reduce the image size, to the Dyadic Wavelet transform is determined on the basis of the resolution for reading the image signals, lies on the fact that the level, at which the greatest number of the granular noises exist, differs depending on the resolution. Accordingly, the multi-resolution conversion processing, which reduce the image size, is conducted up to a level just before the level at which the greatest number of the granular noises exist, and then, is changed to the Dyadic Wavelet transform at the level at which the greatest number of the granular noises exist. By implementing the above process, it becomes possible to reduce the processing load without deteriorating the quality of the processed image.

For instance, when the silver halide film having a size of 135 mm on the order of ISO 100 through 800 is scanned at a resolution of 30 through 90 pixels/mm, it is desirable that the Dyadic Wavelet transform is applied from level 2. When being scanned at a resolution of 90 through 140 pixels/mm, it is desirable that the Dyadic Wavelet transform is applied from level 3. Further, in regard to the image captured by a digital still camera at a resolution of 1-6 Mega-pixels, it is desirable that the Dyadic Wavelet transform is applied from level 2. Further, it is applicable that the changeover level from the multi-resolution conversion processing, which reduce the image size, to the Dyadic Wavelet transform is adjusted according to the size of the image to be outputted as a silver-halide photographic image, etc., based on the processed image signals. It is desirable, however, that the changeover level is determined on the basis of the resolution for reading the image signals as aforementioned, in case of outputting onto the general-use outputting sheet having a L-size-A4 size.

Incidentally, in the present invention, the processing order of the process for applying the multi-resolution conversion processing for reducing the image size and the Dyadic Wavelet transform, and the process for applying the predetermined image processing to the image signals acquired by the above-mentioned conversion processing, is not specifically limited.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
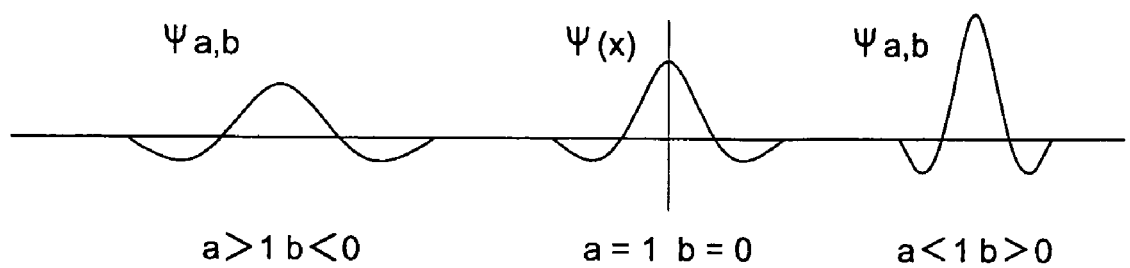
FIG. 1 shows wavelet functions employed in a multi-resolution conversion processing embodied in the present invention.
Figure 2:
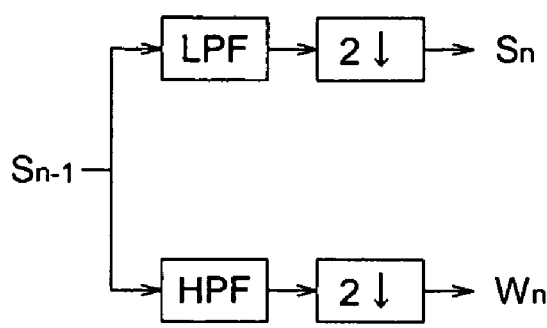
FIG. 2 shows a system block diagram representing a filter processing of the wavelet transform of level 1.
Figure 3:
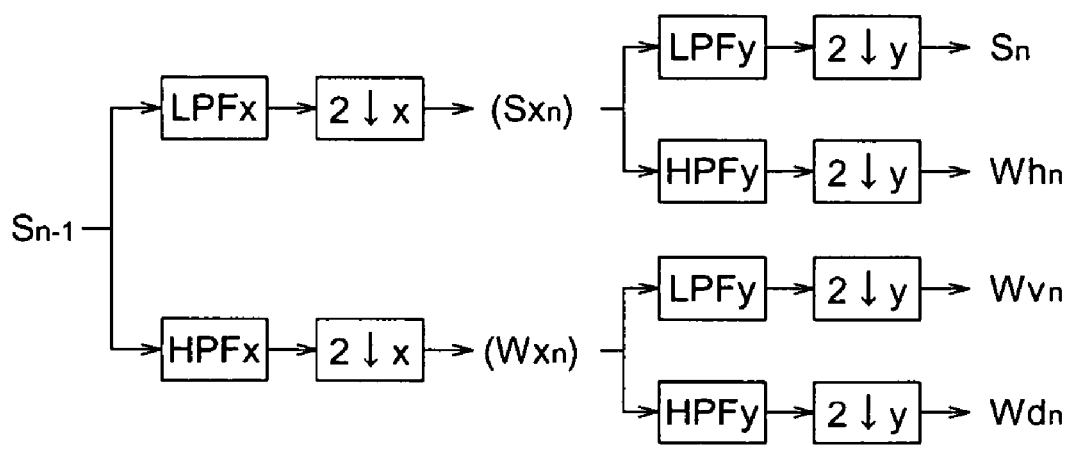
FIG. 3 shows a system block diagram representing a filter processing of the wavelet transform of level 1 in two-dimensional signals.
Figure 4:
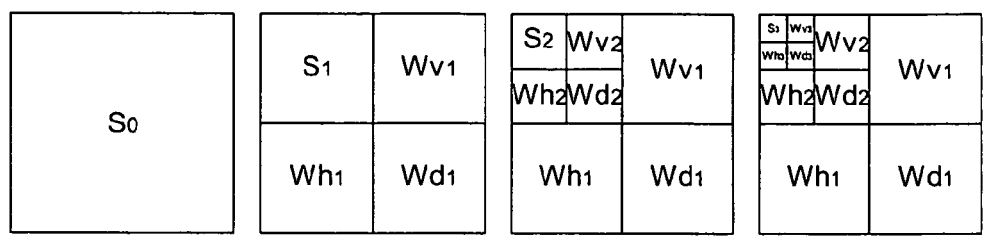
FIG. 4 shows a schematic diagram representing a process of decomposing input signals $S_0$ by means of the wavelet transform of level 1, level 2 and level 3.
Figure 5:
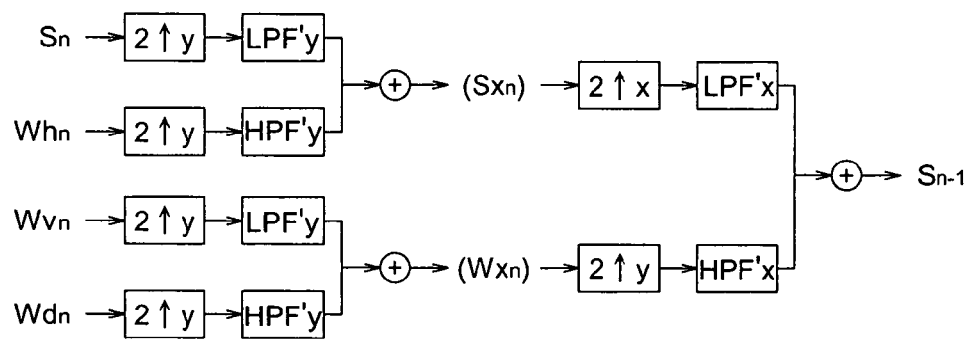
FIG. 5 shows a block diagram representing a method for reconstructing input signals before decomposition, by applying a wavelet inverse-transform by means of filter processing.
Figure 6:
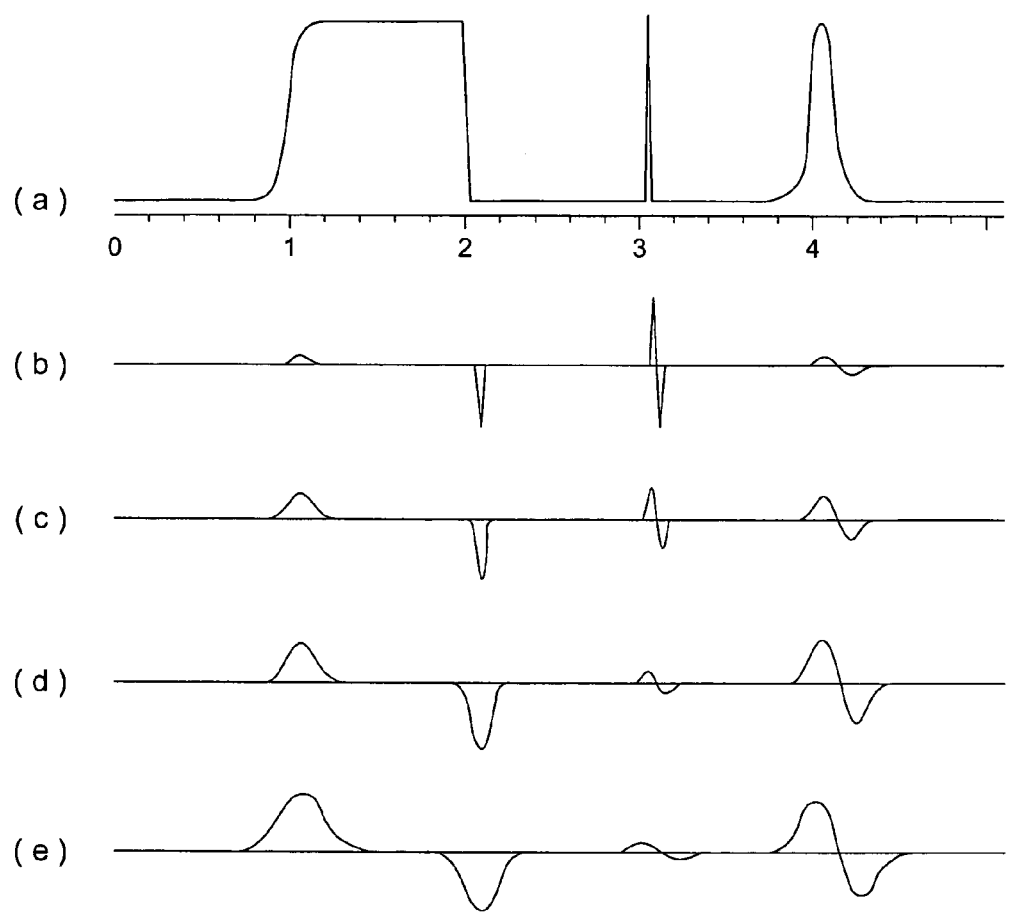
FIG. 6 shows exemplified waveforms of input signal "$S_0$" and high frequency band components, each acquired by the wavelet transform of each level.
Figure 7:
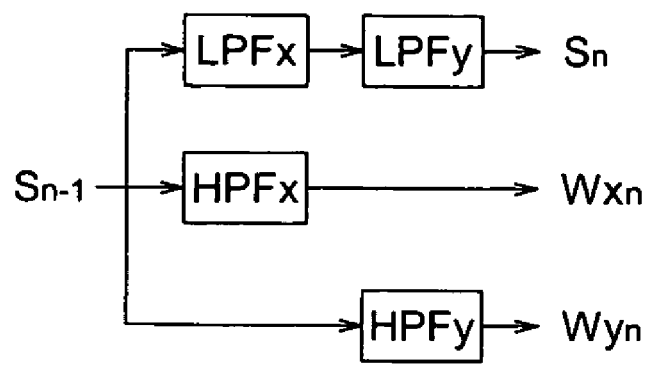
FIG. 7 shows a system block diagram representing a filter processing of the Dyadic Wavelet transform of level 1 in two-dimensional signals.
Figure 8:
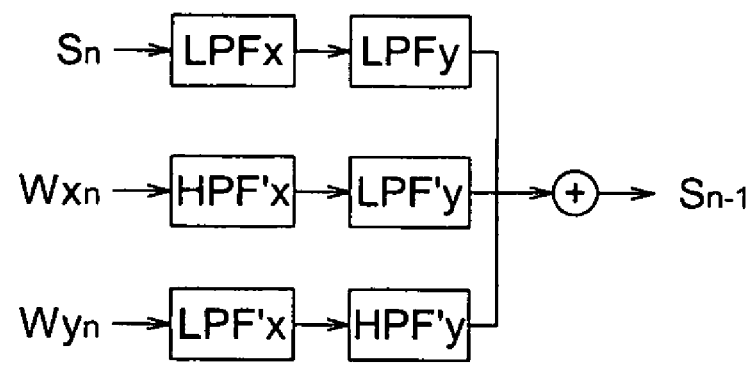
FIG. 8 shows a system block diagram representing a filter processing of the Dyadic Wavelet transform of level 1 in two-dimensional signals.
Figure 9:
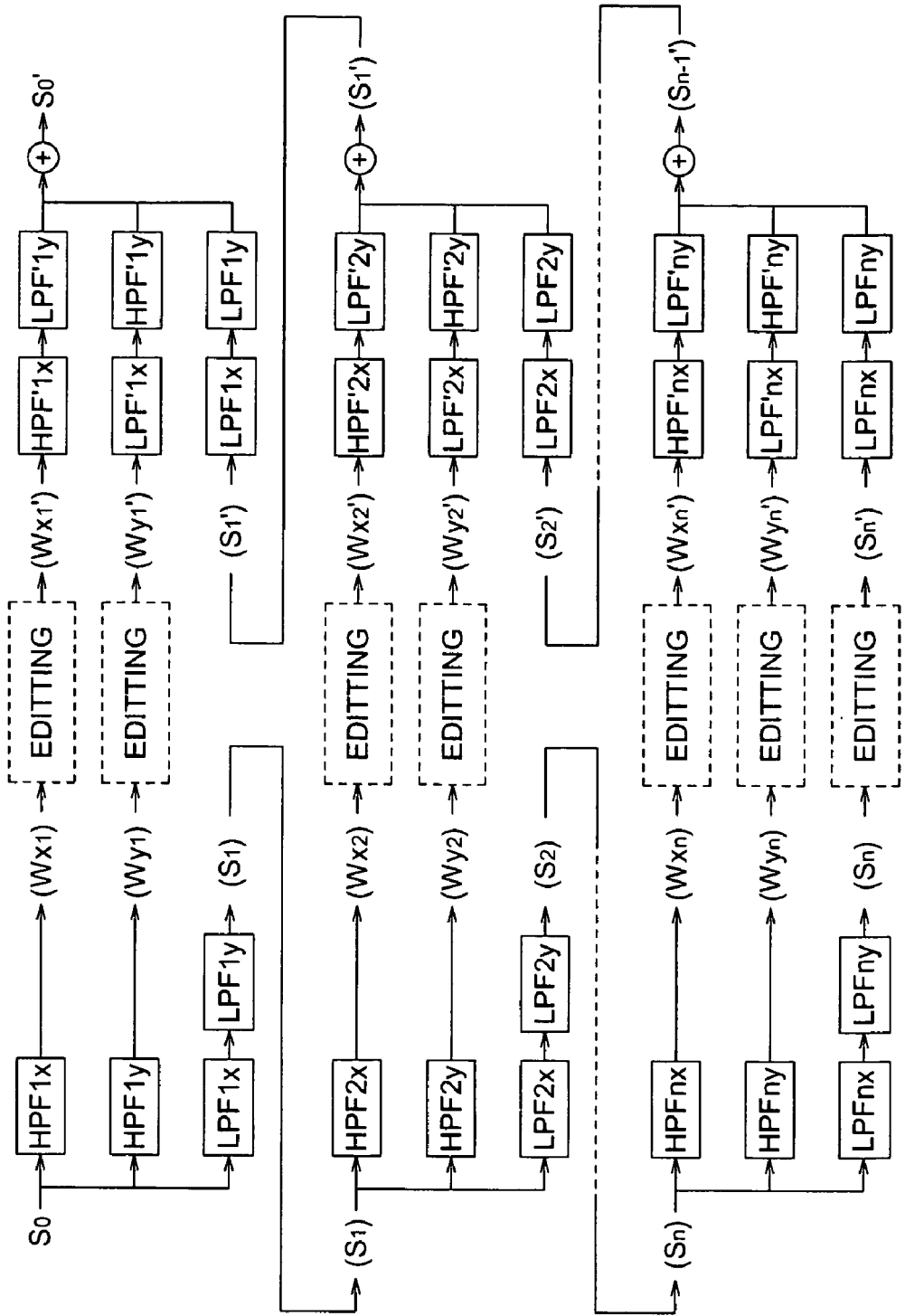
FIG. 9 shows a system block diagram representing a process of applying the Dyadic Wavelet transform to input signal $S_0$ and acquiring output signal $S_0'$ to which an image processing is applied.

Referring to the drawings, the embodiment of the present invention will be detailed in the following.

[Outlook Structure of Image-recording Apparatus 1]

Initially, the configuration of image-recording apparatus 1 will be detailed in the following.

Figure 10:
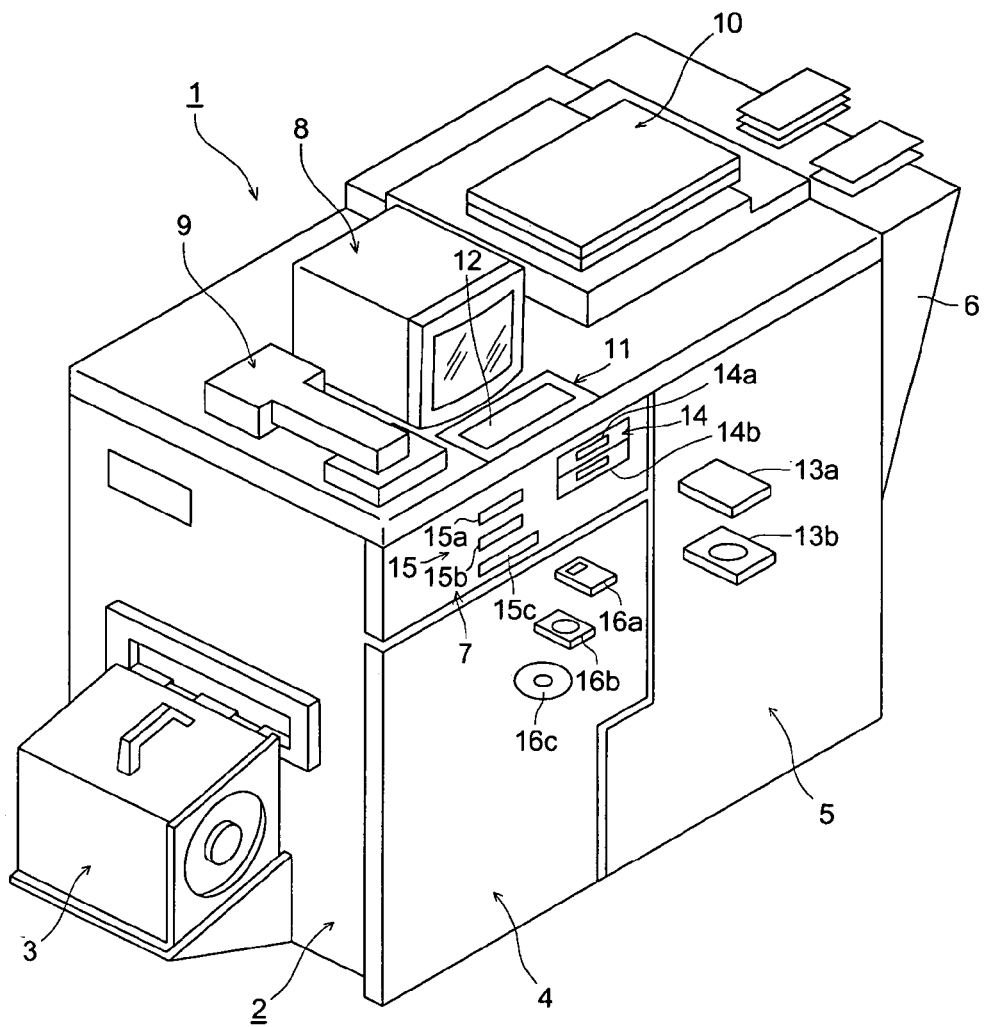
FIG. 10 shows an exemplified outlook configuration of an image-recording apparatus embodied in the present invention.

FIG. 10 shows a perspective view of the outlook structure of image-recording apparatus 1 embodied in the present invention. As shown in FIG. 10, image-recording apparatus 1 is provided with magazine loading section 3 mounted on a side of housing body 2, exposure processing section 4, for exposing a photosensitive material, mounted inside housing body 2 and print creating section 5 for creating a print. Further, tray 6 for receiving ejected prints is installed on another side of housing body 2.

Still further, CRT 8 (Cathode Ray Tube 8) serving as a display device, film scanning section 9 serving as a device for reading a transparent document, reflected document input section 10 and operating section 11 are provided on the upper side of housing body 2. CRT 8 serves as the display device for displaying the image represented by the image information to be created as the print. Further, image reading section 14 capable of reading image information recorded in various kinds of digital recording mediums and image writing section 15 capable of writing (outputting) image signals onto various kinds of digital recording mediums are provided in housing body 2. Still further, control section 7 for centrally controlling the abovementioned sections is also provided in housing body 2.

Image reading section 14 is provided with PC card adaptor 14a, floppy (Registered Trade Mark) disc adaptor 14b, into each of which PC card 13a and floppy disc 13b can be respectively inserted. For instance, PC card 13a has a storage for storing the information with respect to a plurality of frame images captured by the digital still camera. Further, for instance, a plurality of frame images captured by the digital still camera are stored in floppy disc 13b.

Image writing section 15 is provided with floppy (Registered Trade Mark) disk adaptor 15a, MO adaptor 15b and optical disk adaptor 15c, into each of which FD 16a, MO 16b and optical disc 16c can be respectively inserted. Further, CD-R, DVD-R, etc. can be cited as optical disc 16c.

Incidentally, although, in the configuration shown in FIG. 10, operating section 11, CRT 8, film scanning section 9, reflected document input section 10 and image reading section 14 are integrally provided in housing body 2, it is also applicable that one or more of them is separately disposed outside housing body 2.

Further, although image-recording apparatus 1, which creates a print by exposing/developing the photosensitive material, is exemplified in FIG. 10, the scope of the print creating method in the present invention is not limited to the above, but an apparatus employing any kind of methods, including, for instance, an ink-jetting method, an electro-photographic method, a heat-sensitive method and a sublimation method, is also applicable in the present invention.

[Internal Configuration of Image-recording Apparatus 1]

Figure 11:
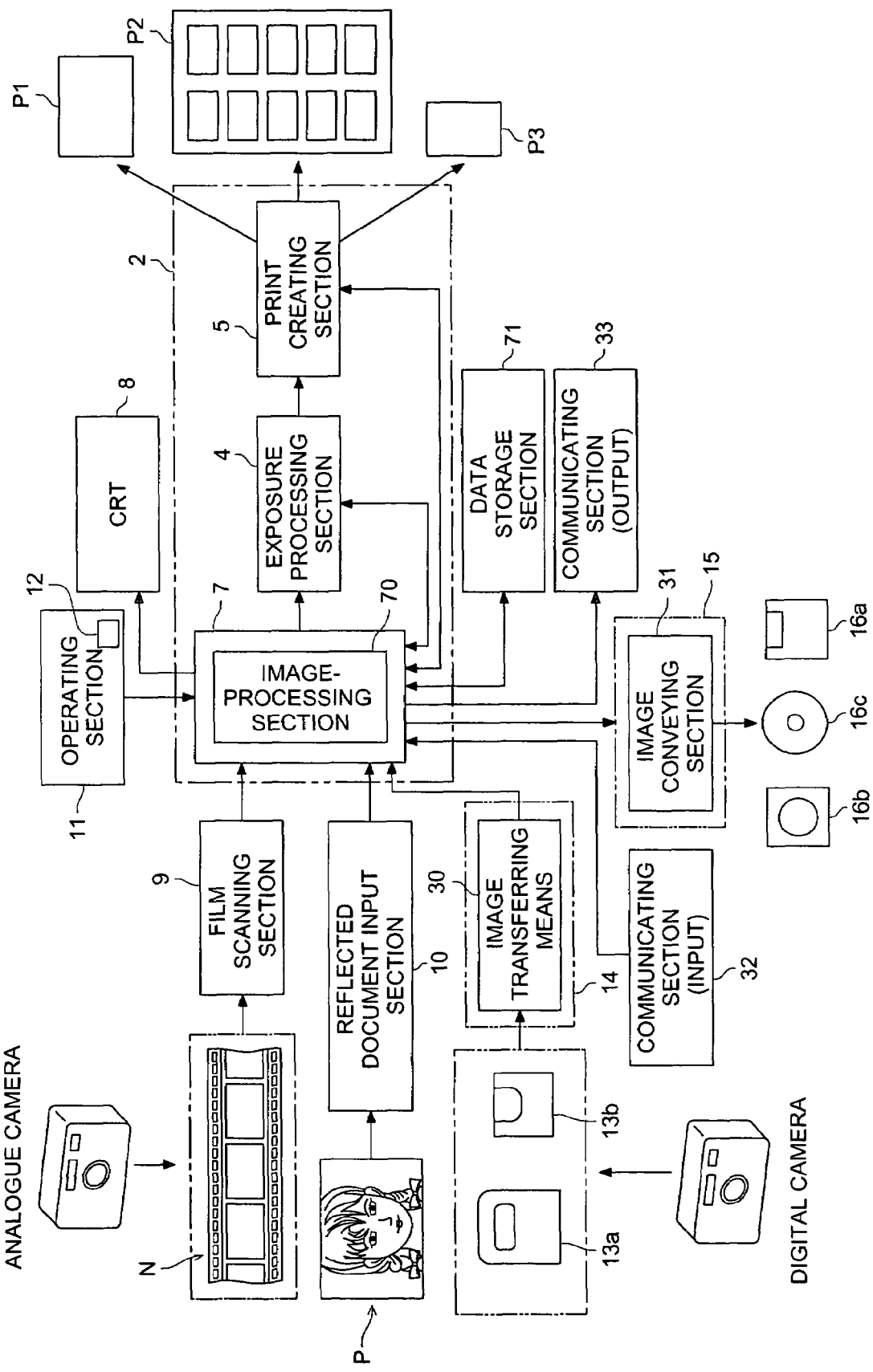
FIG. 11 shows a block diagram representing a functional configuration of the image-recording apparatus shown in FIG. 10.

FIG. 11 shows a block diagram of the internal configuration of image-recording apparatus 1. As shown in FIG. 11, control section 7, exposure processing section 4, print creating section 5, film scanning section 9, reflected document input section 10, image reading section 14, communicating section 32 (input), image writing section 15, data storage section 71, operating section 11, CRT 8 and communicating section 33 (output) constitute image-recording apparatus 1.

Control section 7 includes a microcomputer to control the various sections constituting image-recording apparatus 1 by cooperative operations of CPU (Central Processing Unit) (not shown in the drawings) and various kinds of controlling programs, including an image-processing program, etc., stored in a storage section (not shown in the drawings), such as ROM (Read Only Memory), etc.

Further, control section 7 is provided with image-processing section 70, relating to the image-processing apparatus embodied in the present invention, which applies the image processing of the present invention to image data acquired from film scanning section 9 and reflected document input section 10, image data read from image reading section 14 and image data inputted from an external device through communicating section 32 (input), based on the input signals (command information) sent from operating section 11, to generate the image information of exposing use, which are outputted to exposure processing section 4. Further, image-processing section 70 applies the conversion processing corresponding to its output mode to the processed image data, so as to output the converted image data. Image-processing section 70 outputs the converted image data to CRT 8, image writing section 15, communicating section 33 (output), etc.

Exposure processing section 4 exposes the photosensitive material based on the image signals, and outputs the photosensitive material to print creating section 5. In print creating section 5, the exposed photosensitive material is developed and dried to create prints P1, P2, P3. Incidentally, prints P1 include service size prints, high-vision size prints, panorama size prints, etc., prints P2 include A4-size prints, and prints P3 include visiting card size prints.

Film scanning section 9 reads the frame image data from developed negative film N acquired by developing the negative film having an image captured by an analogue camera. Reflected document input section 10 reads the frame image data from print P made of a photographic printing paper on which the frame image is exposed and developed.

A photosensitive material, such as a color negative film, a color reversal film, etc., can be cited as a document to be read from film scanning section 9 or reflected document input section 10. The frame image information, captured by an analogue camera, are recorded onto the photosensitive material, and the film scanner installed in film scanning section 9 can acquire image-reading signals. Further, when the photosensitive material is a color paper, a flat bed scanner installed in reflected document input section 10 can acquire image-reading signals.

Image reading section 14 reads the frame image information stored in PC card 13a and floppy (Registered Trade Mark) disc 13b to transfer the acquired image information to control section 7. Further, image reading section 14 is provided with PC card adaptor 14a, floppy disc adaptor 14b serving as an image transferring means 30. Still further, image reading section 14 reads the frame image information stored in PC card 13a inserted into PC card adaptor 14a and floppy disc 13b inserted into floppy disc adaptor 14b to transfer the acquired image information to control section 7. For instance, the PC card reader or the PC card slot, etc. can be employed as PC card adaptor 14a.

Communicating section 32 (input) receives image signals representing the captured image and print command signals sent from a separate computer located within the site in which image-recording apparatus 1 is installed and/or from a computer located in a remote site through Internet, etc.

Image writing section 15 is provided with floppy disk adaptor 15a, MO adaptor 15b and optical disk adaptor 15c, serving as image conveying section 31. Further, according to the writing signals inputted from control section 7, image writing section 15 writes the data, generated by the image-processing method embodied in the present invention, into floppy disk 16a inserted into floppy disk adaptor 15a, MO disc 16*b* inserted into MO adaptor 15*b* and optical disk 16*c* inserted into optical disk adaptor 15*c*.

Data storage section 71 stores the image information and its corresponding order information (including information of a number of prints and a frame to be printed, information of print size, etc.) to sequentially accumulate them in it.

Operating section 11 is provided with information inputting means 12. Information inputting means 12 is constituted by a touch panel, etc., so as to output a push-down signal generated in information inputting means 12 to control section 7 as an inputting signal. Incidentally, it is also applicable that operating section 11 is provided with a keyboard, a mouse, etc. Further, CRT 8 displays image information, etc., according to the display controlling signals inputted from control section 7.

Communicating section 33 (output) transmits the output image signals, representing the captured image and processed by the image-processing method embodied in the present invention, and its corresponding order information to a separate computer located within the site in which image-recording apparatus 1 is installed and/or to a computer located in a remote site through Internet, etc.

[Configuration of Image-processing Section 70]

Figure 12:
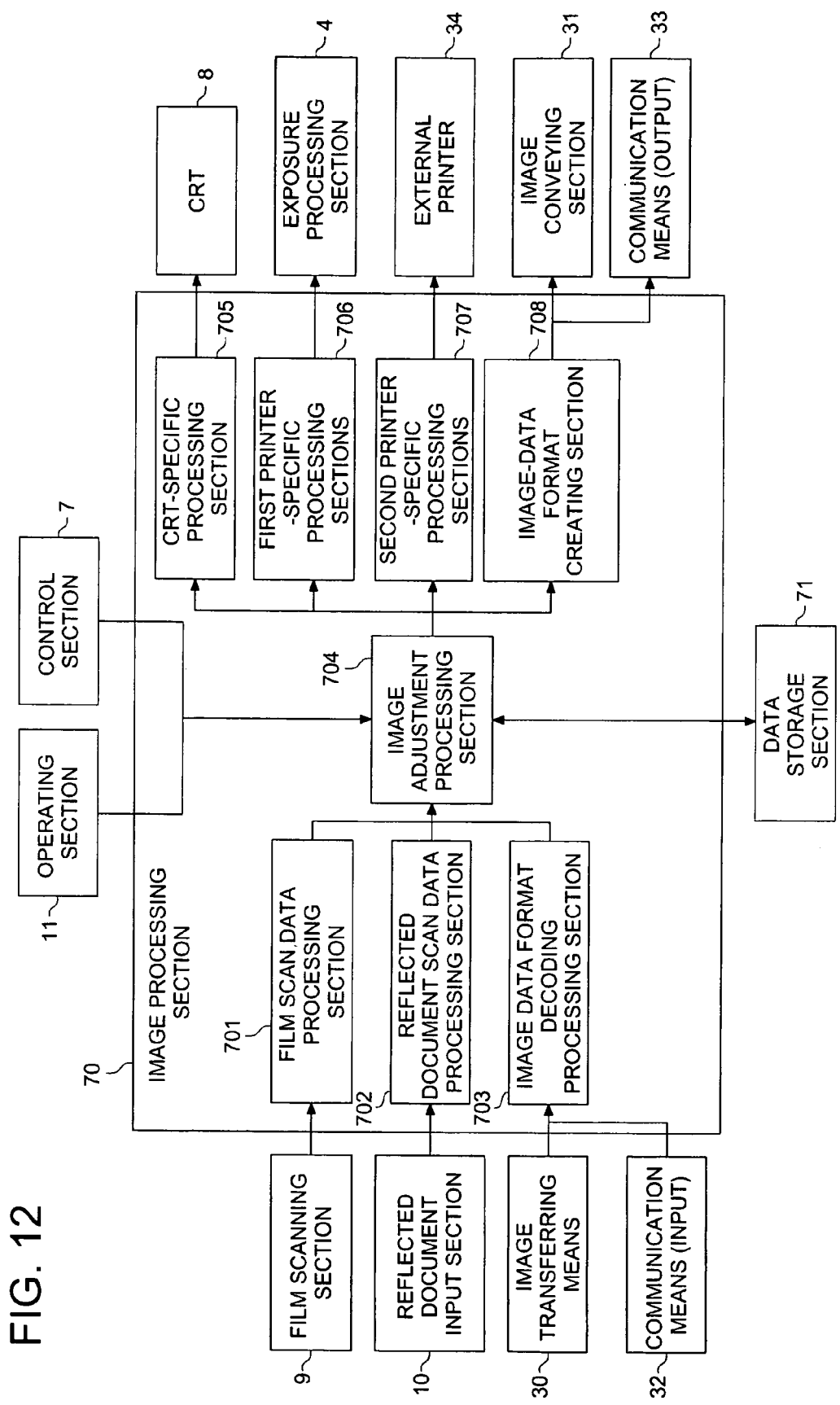
FIG. 12 shows a block diagram representing a functional configuration of an image-processing section shown in FIG. 11.

FIG. 12 shows a block diagram of the functional configuration of image-processing section 70 embodied in the present invention. As shown in FIG. 12, film scan data processing section 701, reflected document scan data processing section 702, image data format decoding processing section 703, image adjustment processing section 704, CRT-specific processing section 705, first printer-specific processing sections 706, second printer-specific processing sections 707 and image-data format creating section 708 constitute image-processing section 70.

In film scan data processing section 701, various kinds of processing, such as calibrating operations inherent to film scanning section 9, a negative-to-positive inversion in case of negative document, a gray balance adjustment, a contrast adjustment, etc., are applied to the image signals inputted from film scanning section 9, and then, processed image signals are transmitted to image adjustment processing section 704. Further, film scan data processing section 701 also transmits a film size and a type of negative/positive, as well as an ISO sensitivity, a manufacturer's name, information on the main subject and information on photographic conditions (for example, information described in APS), optically or magnetically recorded on the film, to the image adjustment processing section 704.

In reflected document scan data processing section 702, the calibrating operations inherent to reflected document input section 10, the negative-to-positive inversion in case of negative document, the gray balance adjustment, the contrast adjustment, etc., are applied to the image signals inputted from reflected document input section 10 and then, processed image signals are transmitted to image adjustment processing section 704.

Image data format decoding processing section 703 performs converting operations of the method for reproducing the compressed code or the method for representing color signals, etc., according to the data format of the image data inputted from image transferring means 30 or communicating section 32 (input), and then, transmits converted image signals to image adjustment processing section 704.

Image adjustment processing section 704 can receive the image information processed and outputted by each of film scan data processing section 701, reflected document scan data processing section 702 and image data format decoding processing section 703, and further, can also receive the information pertaining to the main subject and the information on the photographic conditions, generated by inputting operations at operating section 11.

Based on the command signals sent from operating section 11 or control section 7, image adjustment processing section 704 applies the multi-resolution conversion processing of at least level 1, which reduces the image size (for instance, the bi-orthogonal wavelet conversion), to the image signals inputted from anyone of film scanning section 9, reflected document input section 10, image transferring means 30 and communicating section 32 (input), and then, further applies the Dyadic Wavelet transform of at least level 1 to low frequency band component signals included in the converted image signals acquired by applying the abovementioned multi-resolution conversion processing. At this time, image adjustment processing section 704 determines a changeover level from the multi-resolution conversion processing, which reduces the image size, to the Dyadic Wavelet transform, based on the resolution of reading said image signals, and then, conducts the multi-resolution conversion processing and the Dyadic Wavelet transform according to the determined changeover level.

Further, image adjustment processing section 704 applies image-processing operations, detailed later in the embodiment 1 (refer to FIG. 13) and the embodiment 2 (refer to FIG. 14), to the high frequency band component signals included in the converted image signals acquired by applying the abovementioned multi-resolution conversion processing, which reduces the image size, and the Dyadic Wavelet transform to the image signals, and then, applies the Dyadic Wavelet inverse-transform and the multi-resolution inverse-conversion processing to the image-processed image signals. Still further, image adjustment processing section 704 transmits the processed image signals to CRT-specific processing section 705, first printer-specific processing sections 706, second printer-specific processing sections 707, image-data format creating section 708 and data storage section 71.

CRT-specific processing section 705 applies a pixel number changing processing, a color matching processing, etc. to the processed image signals received from image adjustment processing section 704, as needed, and then, transmits display signals synthesized with information necessary for displaying, such as control information, etc., to CRT 8.

First printer-specific processing sections 706 applies a calibrating processing inherent to exposure processing section 4, a color matching processing, a pixel number changing processing, etc. to the processed image signals received from image adjustment processing section 704, as needed, and then, transmits output image signals to exposure processing section 4.

In case that external printing apparatus 34, such as a large-sized printing apparatus, etc., is coupled to image-recording apparatus 1 embodied in the present invention, a printer-specific processing section, such as second printer-specific processing sections 707, is provided for every apparatus, so as to conduct an appropriate calibrating processing for each specific printer, a color matching processing, a pixel number change processing, etc.

In image-data format creating section 708, the format of the image signals received from image adjustment processing section 704 are converted to one of various kinds of general-purpose image formats, represented by JPEG (Joint Photographic Coding Experts Group), TIFF (Tagged Image File Format), Exif (Exchangeable Image File Format), etc., as needed, and then, the converted image signals are transmitted to image conveying section 31 or communicating section (output) 33.

Incidentally, the aforementioned sections, such as film scan data processing section 701, reflected document scan data processing section 702, image data format decoding processing section 703, image adjustment processing section 704, CRT-specific processing section 705, first printer-specific processing sections 706, second printer-specific processing sections 707 and image-data format creating section 708, are eventually established for helping the understandings of the functions of image-processing section 70 embodied in the present invention. Accordingly, it is needless to say that each of these sections is not necessary established as a physically independent device, but is possibly established as a kind of software processing section with respect to a single CPU (Central Processing Unit). Further, the scope of the image-recording apparatus 1 embodied in the present invention is not limited to the above, but it is also applicable for various kinds of embodiments including a digital photo-printer, a printer driver, plug-ins of various kinds of image-processing software, etc.

As a next step, with respect to the processing, which are conducted in image adjustment processing section 704 shown in FIG. 12, embodiment 1 and embodiment 2 will be detailed in the following. In embodiment 1 and embodiment 2, the bi-orthogonal wavelet conversion is employed as the multi-resolution conversion processing, which reduces the image size.

Embodiment 1

Figure 13:
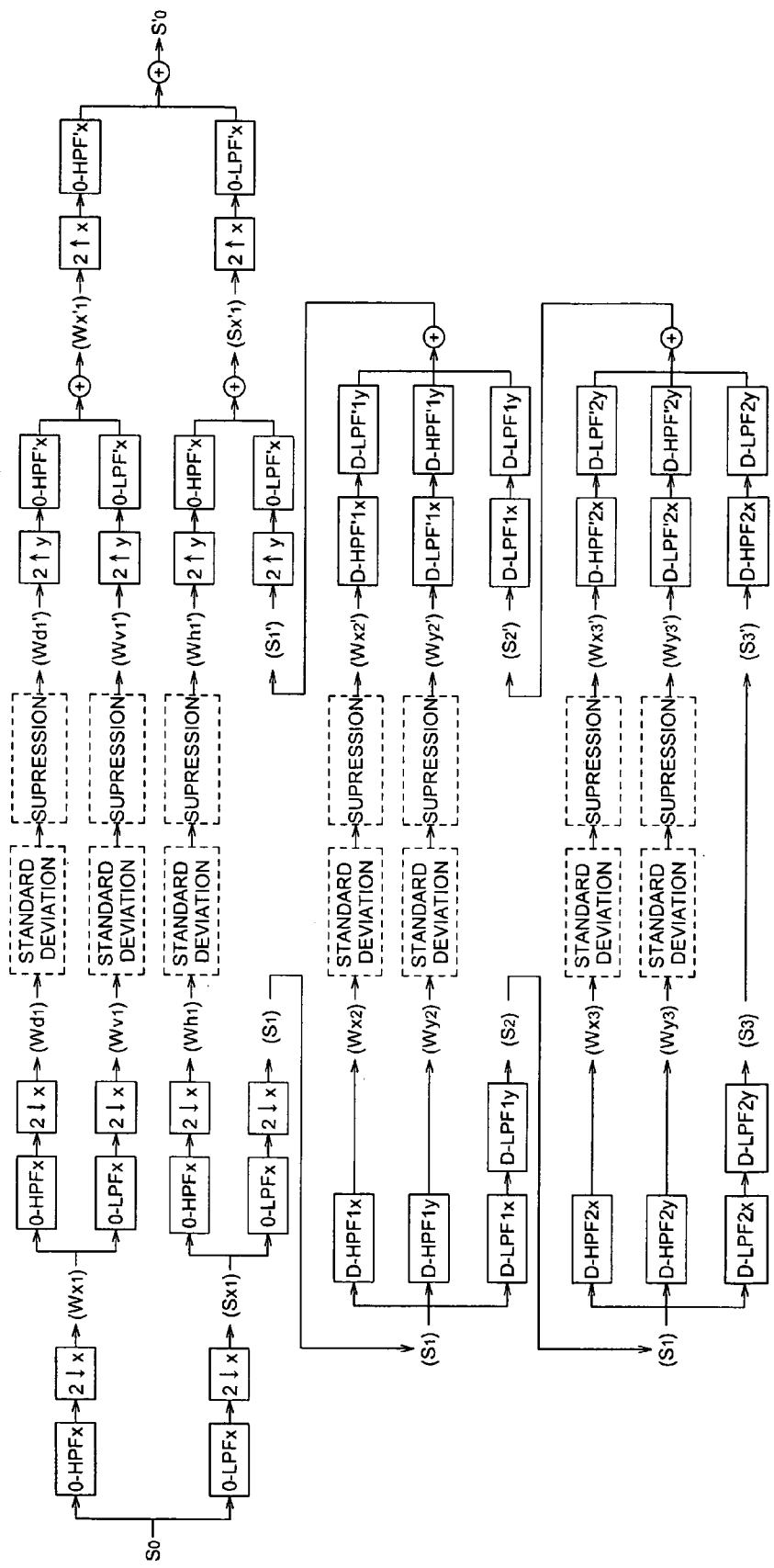
FIG. 13 shows a block diagram in regard to internal processing in the image adjustment processing section in embodiment 1.

FIG. 13 shows a system block diagram of the internal processing performed in image adjustment processing section 704 of embodiment 1. In embodiment 1, the bi-orthogonal wavelet conversion is employed for the conversion of level 1, while the Dyadic Wavelet transform is employed for the conversions of level 2 and level 3. Further, embodiment 1 indicates such a case that a processing for suppressing the signal intensities is conducted on the basis of standard deviations of the high frequency band component signals, which are included in the image signals acquired by the bi-orthogonal wavelet conversion and the Dyadic Wavelet transform. When the image signals to be processed are the color image signals, the color image signals are decomposed into luminance signals and chrominance signals from its R, G, B signals in advance (not shown in the drawings).

Incidentally, in the embodiment 1, the filters having the following coefficients (Cohen, Daubechies, Feauveau 9-7) shown in Table 1 are employed in the bi-orthogonal wavelet conversion and its inverse-conversion. In Table 1 and FIG. 13, O_HPF and O_LPF denote the high-pass filter and the low-pass filter used for the bi-orthogonal wavelet conversion, respectively. Further, O_HPF' and O_LPF' denote the high-pass filter and the low-pass filter used for the bi-orthogonal wavelet inverse-conversion, respectively.

TABLE 1

| x  | O_HPF     | O_LPF     | O_HPF'    | O_LPF'    |
|----|-----------|-----------|-----------|-----------|
| −4 |           | 0.037829  | −0.037829 |           |
| −3 | −0.064539 | −0.023849 | −0.023849 | −0.064539 |
| −2 | 0.04069   | −0.110624 | 0.110624  | −0.04069  |
| −1 | 0.418092  | 0.377403  | 0.377403  | 0.418092  |
| 0  | −0.788485 | 0.852699  | −0.852699 | 0.788485  |
| 1  | 0.418092  | 0.377403  | 0.377403  | 0.418092  |
| 2  | 0.04069   | −0.110624 | 0.110624  | −0.04069  |

TABLE 1-continued

| x | O_HPF     | O_LPF     | O_HPF'    | O_LPF'    |
|---|-----------|-----------|-----------|-----------|
| 3 | −0.064539 | −0.023849 | −0.023849 | −0.064539 |
| 4 |           | 0.037829  | −0.037829 |           |

In Table 1, the coefficients for x=0 corresponds to a current pixel currently being processed, the coefficients for x=−1 corresponds to a pixel just before the current pixel, the coefficients for x=1 corresponds to a pixel just after the current pixel (following as well).

Further, in the embodiment 1, the filters having the following coefficients shown in Table 2 are employed in the Dyadic Wavelet transform and its inverse-transform. In Table 2 and FIG. 13, D_HPF1 and D_LPF1 denote the high-pass filter and the low-pass filter used for the Dyadic Wavelet transform, respectively. Further, D_HPF'1 and D_LPF'1 denote the high-pass filter and the low-pass filter used for the Dyadic Wavelet transform, respectively.

TABLE 2

| x  | D_HPF1 | D_LPF1 | D_HPF' 1  | D_LPF' 1  |
|----|--------|--------|-----------|-----------|
| −3 |        |        | 0.0078125 | 0.0078125 |
| −2 |        |        | 0.054685  | 0.046875  |
| −1 |        | 0.125  | 0.171875  | 0.1171875 |
| 0  | −2.0   | 0.375  | −0.171875 | 0.65625   |
| 1  | 2.0    | 0.375  | −0.054685 | 0.1171875 |
| 2  |        | 0.125  | −0.0078125| 0.046875  |
| 3  |        |        |           | 0.0078125 |

Table 2, the coefficients for x=0 corresponds to a current pixel currently being processed, the coefficients for x=−1 corresponds to a pixel just before the current pixel, the coefficients for x=1 corresponds to a pixel just after the current pixel.

Further, in the Dyadic Wavelet transform, the filter coefficients are different relative to each other for every level. A coefficient obtained by inserting $2^{n-1}-1$ zeros between coefficients of filters on level 1 is used as a filter coefficient on level "n".

Each of the compensation coefficients $\gamma_i$ determined in response to the level "i" of the Dyadic Wavelet transform is shown in Table 3.

TABLE 3

| i | γ          |
|---|------------|
| 1 | 0.66666667 |
| 2 | 0.89285714 |
| 3 | 0.97087379 |
| 4 | 0.99009901 |
| 5 | 1          |

The abovementioned bi-orthogonal wavelet filters are used for input signal $S_0$, serving as a luminance signal, to acquire high frequency band component signals of level 1 $Wd_1$, $Wv_1$, $Wh_1$ and low frequency band component signal $S_1$. Then, the abovementioned bi-orthogonal wavelet filters are used for low frequency band component signal $S_1$ to acquire high frequency band component signals of level 2 $Wx_2$, $Wy_2$ and low frequency band component signal $S_2$. In the same manner, high frequency band component signals of level 2 $Wx_3$, $Wy_3$ and low frequency band component signal $S_3$ would be acquired from $S_2$. After that, a standard deviation of each high frequency band component signals is calculated to determine the reference threshold value for suppressing the signal intensities based on the calculated threshold value, and then, the suppression processing is applied to a pixel having a signal intensity equal to or lower than the threshold value. Then, the Dyadic Wavelet transform is conducted to acquire the processed luminance signals. It is also applicable that the same process is applied to the chrominance signals. Finally, the processed luminance signals and the processed chrominance signals are converted to R, G, B signals (not shown in the drawings) to obtain the processed color image signals.

At first, the image captured by, for instance, the camera of ISO 800 with a size of 35 mm is read at a resolution of 61 pixels/mm to generate the image signals of the image. With respect to the image signals, threshold values of level 1, level 2 and level 3 are determined at ($\sigma \times 0.7$), ($\sigma \times 1.1$) and ($\sigma \times 0.7$), respectively, where $\sigma$ denotes a standard deviation of absolute signal intensity value. Then, it is applied to the image signals such a processing that the signal intensity of a pixel, which is larger than the threshold value, is converted to zero, while, the signal intensity of a pixel, which is smaller than the threshold value, is kept as it is. Successively, a reproduced image is outputted onto a silver-halide printing paper at a resolution of 300 dpi with 2L size, based on the processed image signals, to observe the reproduced image.

According to image-recording apparatus 1 of embodiment 1, since the bi-orthogonal wavelet conversion, serving as a multi-resolution conversion processing for reducing the image size, is applied to the image signals read from the original image, and then, the Dyadic Wavelet transform is applied, so that the image processing is applied to the high frequency band component signals acquired by applying the multi-resolution conversion processing and the Dyadic Wavelet transform, it becomes possible to reduce the processing load without causing a deterioration of the image quality.

Further, since the processing for suppressing the signal intensity (for instance, a processing for converting the signal intensity to zero) is applied to pixels whose signal intensities are equal to or smaller than the threshold value determined from the standard deviation of absolute signal intensity value of the high frequency band component and the signal intensities of other pixels are kept as they are, it becomes possible to eliminate granular noises in a further desirable manner and to obtain a natural image without generating artifacts and without giving a sense of incongruity to the viewer.

Still further, since the changeover level from the multi-resolution conversion processing, which reduce the image size (for instance, the bi-orthogonal wavelet conversion), to the Dyadic Wavelet transform is determined on the basis of the resolution for reading the image signals, it becomes possible to reduce the processing load in a most effective manner without causing a deterioration of the image quality.

Incidentally, even if the image is acquired by applying only the Dyadic Wavelet transform up to level 3, and by applying the image processing with the threshold values in the same manner as mentioned above, such the image would have little artifacts and little sense of smooth feeling as adverse effects of the image-processing, and further, has little mottled granular noises. However, when the bi-orthogonal wavelet conversion is employed for the conversion of level 1, the processing velocity would be improved far higher than the above.

Embodiment 2

Figure 14:
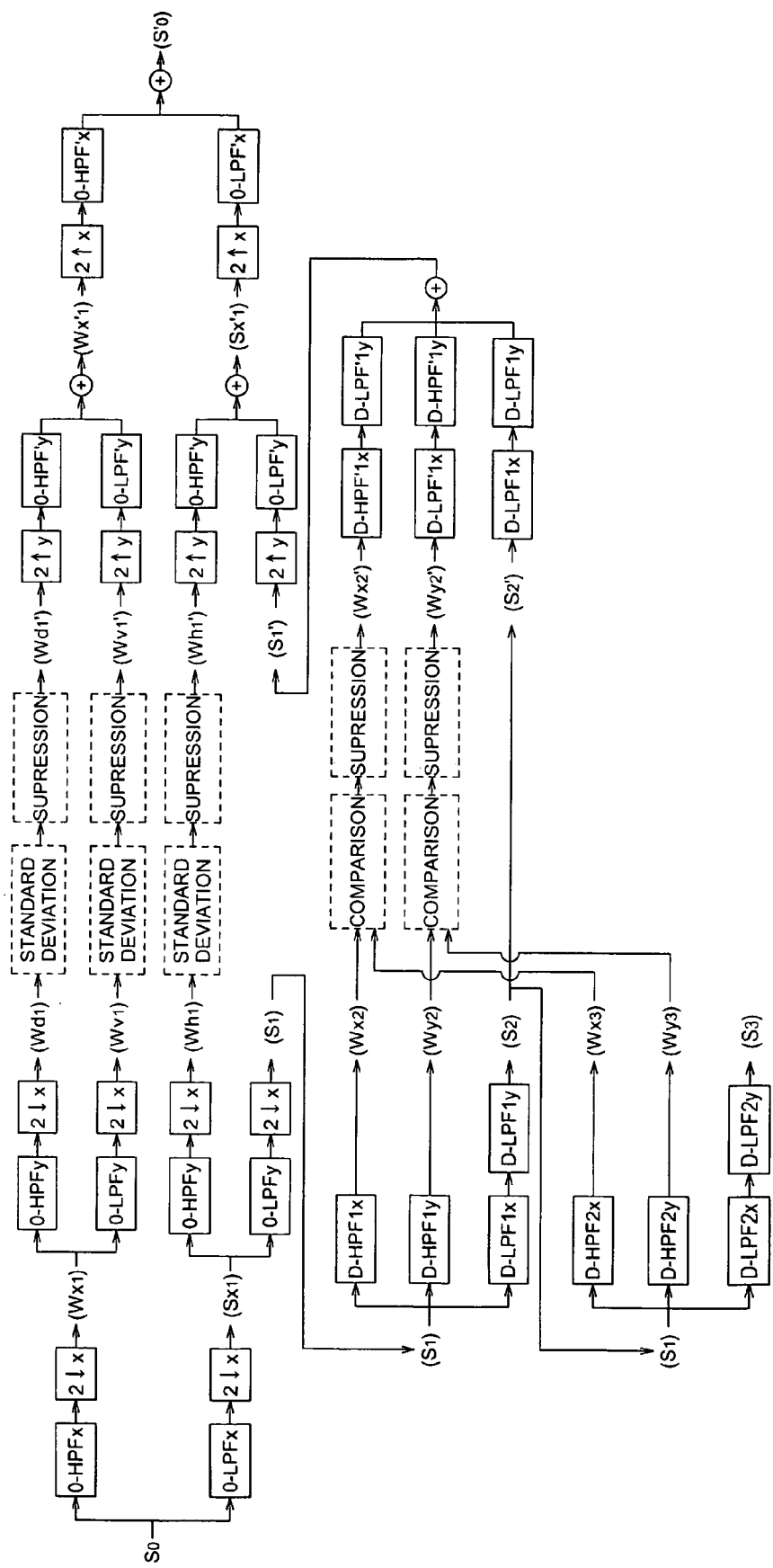
FIG. 14 shows a block diagram in regard to internal processing in the image adjustment processing section in embodiment 2.

FIG. 14 shows a system block diagram of the internal processing performed in image adjustment processing section 704 of embodiment 2. In embodiment 2, the bi-orthogonal wavelet conversion is employed for the conversion of level 1 to suppress the signal intensity on the basis of the standard deviation of the high frequency band component signal of level 1, while the Dyadic Wavelet transform is employed for the conversions of level 2 and level 3 to suppress the high frequency band component signals of level 2 on the basis of the comparison with the high frequency band component signals of level 3. In the embodiment 2, the filters having the coefficients shown in Table 1 are also employed in the bi-orthogonal wavelet conversion and its inverse-conversion, and the filters having the coefficients shown in Table 2 are employed in the Dyadic Wavelet transform and its inverse-transform.

Further, although the suppression processing is not applied to high frequency band components $Wx_3$, $Wy_3$ acquired from the Dyadic Wavelet transform of level 3 in the embodiment 2, it is also possible to apply the suppression processing to them by employing the standard deviation as well as the embodiment 1. Still further, as well as the embodiment 1, when the image signals to be processed are the color image signals, the color image signals are decomposed into the luminance signals and the chrominance signals from its R, G, B signals in advance to the image processing.

To compare high frequency band components $Wx_2$, $Wy_2$ of level 2 with high frequency band components $Wx_3$, $Wy_3$ of level 3, there can be employed such a method that, at first, value "u"=(signal intensity of high frequency band component of level 3)/(signal intensity of high frequency band component of level 2) is calculated, and then, when the calculated value "u" is equal to or smaller than, for instance, 0.85, the signal intensity of high frequency band component of level 2 at the concerned pixel is converted to zero.

As described in the above, according to image-recording apparatus 1 of embodiment 2, it becomes possible to obtain a reproduced image having little mottled granular noises without causing adverse effects of the image processing, such as artifacts, a sense of smooth feeling, etc., and to perform the image processing at a very high-velocity rate.

Disclosed embodiment can be varied by a skilled person without departing from the spirit and scope of the invention.

As described in the foregoing, according to the present invention, the following effects can be attained.

(1) Since the multi-resolution conversion processing for reducing the image size is applied to the image signals read from the original image, and then, the Dyadic Wavelet transform is applied, so as to apply the image processing, it becomes possible to improve the processing velocity without causing a deterioration of the image quality.

(2) Since the image processing is applied to high frequency band component signals, among image signals to which the multi-resolution conversion processing and the Dyadic Wavelet transform are applied, it becomes possible to effectively eliminate the granular noises.

(3) Since the processing for suppressing the signal intensity is applied to the pixel, which fulfils a predetermined condition established in advance, and the signal intensities of other pixels are kept as they are, it becomes possible to eliminate granular noises in a further desirable manner and to obtain a natural image without generating artifacts and without giving a sense of incongruity to the viewer.

(4) Since the changeover level from the multi-resolution conversion processing, which reduces the image size, to the Dyadic Wavelet transform is determined on the basis of the resolution for reading the image signals, it becomes possible to reduce the processing load in a most effective manner without causing a deterioration of the image quality.

What is claimed is:

1. A method for processing image signals, comprising:
reading an image recorded on a recording medium so as to generate image signals representing said image;
applying, to said image signals, using a processing unit, a multi-resolution conversion processing of at least level 1, which is capable of reducing an image size of said image signals, so as to generate first-converted image signals from said image signals; and
applying a Dyadic Wavelet transform of at least level 1 to lowest frequency band component signals included in said first-converted image signals, so as to generate second-converted image signals from said first-converted image signals;
wherein no down-sampling is performed in said Dyadic Wavelet transform, and wavelet function $\psi_{i,j}(x)$ to be employed in said Dyadic Wavelet transform is defined by an equation shown below:

$$\left|\psi_{i,j}(x) = 2^{-i}\psi\left(\frac{x-j}{2^i}\right)\right|$$

where "i" and "j" denote natural numbers;
wherein an image size of said first-converted image signals is smaller than the image size of said image signals, while an image size of said second-converted image signals is identical to the image size of said first-converted image signals;
wherein the method further comprises determining a changeover level from said multi-resolution conversion processing to said Dyadic Wavelet transform, based on a resolution of said read image signals; and
wherein said multi-resolution conversion processing is applied to said image signals according to said determined changeover level, and said Dyadic Wavelet transform is applied to said low frequency band component signals according to said determined changeover level.

2. The method of claim 1, further comprising:
applying a first image processing to said second-converted image signals generated by applying said Dyadic Wavelet transform.

3. The method of claim 1, further comprising:
applying a first image processing to high frequency band component signals included in said second-converted image signals generated by applying said Dyadic Wavelet transform.

4. The method of claim 3, wherein said first image processing comprises suppressing a signal intensity of a specific pixel, which fulfils a predetermined condition established in advance among pixels represented by said high frequency band component signals.

5. The method of claim 2, further comprising:
applying a second image processing to said first-converted image signals generated by applying said multi-resolution conversion processing.

6. The method of claim 2, further comprising:
applying a second image processing to high frequency band component signals included in said first-converted image signals generated by applying said multi-resolution conversion processing.

7. The method of claim 6, wherein said second image processing comprises suppressing a signal intensity of a specific pixel, which fulfils a predetermined condition established in advance among pixels represented by said high frequency band component signals.

8. The method of claim 1, wherein said multi-resolution conversion is an orthogonal wavelet conversion or a bi-orthogonal wavelet conversion.

9. An apparatus for processing image signals, comprising:
a processing unit;
a reading section to read an image recorded on a recording medium so as to generate image signals representing said image;
a first converting section to apply a multi-resolution conversion processing of at least level 1, which is capable of reducing an image size of said image signals, to said image signals read by said reading section, so as to generate first-converted image signals from said image signals; and
a second converting section to apply a Dyadic Wavelet transform of at least level 1 to low frequency band component signals included in said first-converted image signals generated by said first converting section, so as to generate second-converted image signals from said first-converted image signals;
wherein no down-sampling is performed in said Dyadic Wavelet transform, and wavelet function $\psi_{i,j}(x)$ to be employed in said Dyadic Wavelet transform is defined by an equation shown below:

$$\left|\psi_{i,j}(x) = 2^{-i}\psi\left(\frac{x-j}{2^i}\right)\right|$$

where "i" and "j" denote natural numbers;
wherein an image size of said first-converted image signals is smaller than the image size of said image signals, while an image size of said second-converted image signals is identical to the image size of said first-converted image signals;
wherein the apparatus further comprises a determining section to determine a changeover level from said multi-resolution conversion processing to said Dyadic Wavelet transform, based on a resolution of said image signals read by said reading section; and
wherein said first converting section applies said multi-resolution conversion processing to said image signals according to said changeover level determined by said determining section, and said second converting section applies said Dyadic Wavelet transform to said low frequency band component signals according to said changeover level determined by said determining section.

10. The apparatus of claim 9, further comprising:
a first image-processing section to apply a first image processing to said second-converted image signals generated by said second converting section.

11. The apparatus of claim 9, further comprising:
a first image-processing section to apply a first image processing to high frequency band component signals included in said second-converted image signals generated by said second converting section.

12. The apparatus of claim 11, wherein said first image processing comprises suppressing a signal intensity of a specific pixel, which fulfils a predetermined condition established in advance among pixels represented by said high frequency band component signals.

13. The apparatus of claim 10, further comprising:
a second image-processing section to apply a second image processing to said first-converted image signals generated by said first converting section.

14. The apparatus of claim 10, further comprising:
a second image-processing section to apply a second image processing to high frequency band component signals included in said first-converted image signals generated by said first converting section.

15. The apparatus of claim 14, wherein said second image processing comprises suppressing a signal intensity of a specific pixel, which fulfils a predetermined condition established in advance among pixels represented by said high frequency band component signals.

16. The apparatus of claim 9, wherein said multi-resolution conversion is an orthogonal wavelet conversion or a bi-orthogonal wavelet conversion.

17. A computer readable storage medium storing a computer program that is executable by a computer to cause the computer to conduct operations for processing image signals, the program being executable by the computer to cause the computer to perform a process comprising:
reading an image recorded on a recording medium so as to generate image signals representing said image;
applying, to said read image signals, a multi-resolution conversion processing of at least level 1, which is capable of reducing an image size of said image signals, so as to generate first-converted image signals from said image signals; and
applying a Dyadic Wavelet transform of at least level 1 to low frequency band component signals included in said first-converted image signals, so as to generate second-converted image signals from said first-converted image signals;
wherein no down-sampling is performed in said Dyadic Wavelet transform, and wavelet function $\psi_{i,j}(x)$ to be employed in said Dyadic Wavelet transform is defined by an equation shown below:

$$\left|\psi_{i,j}(x) = 2^{-i}\psi\left(\frac{x-j}{2^i}\right)\right|$$

where "i" and "j" denote natural numbers;
wherein an image size of said first-converted image signals is smaller than the image size of said image signals, while an image size of said second-converted image signals is identical to the image size of said first-converted image signals;
wherein said processing section further comprises a determining section to determine a changeover level from said multi-resolution conversion processing to said Dyadic Wavelet transform, based on a resolution of said image signals read by said reading section; and
wherein said first converting section applies said multi-resolution conversion processing to said image signals according to said changeover level determined by said determining section, and said second converting section applies said Dyadic Wavelet transform to said low frequency band component signals according to said changeover level determined by said determining section.

18. The computer readable storage medium of claim 17, wherein the process further comprises:
applying a first image processing to said second-converted image signals generated by applying said Dyadic Wavelet transform.

19. The computer readable storage medium of claim 17, wherein the process further comprises:

applying a first image processing to high frequency band component signals included in said second-converted image signals generated by applying said Dyadic Wavelet transform.

20. The computer readable storage medium of claim 19, wherein said first image processing comprises suppressing a signal intensity of a specific pixel, which fulfils a predetermined condition established in advance among pixels represented by said high frequency band component signals.

21. The computer readable storage medium of claim 18, wherein the process further comprises:
applying a second image processing to said first-converted image signals generated by applying said multi-resolution conversion processing.

22. The computer readable storage medium of claim 18, wherein the process further comprises:
applying a second image processing to high frequency band component signals included in said first-converted image signals generated by applying said multi-resolution conversion processing.

23. The computer readable storage medium of claim 22, wherein said second image processing comprises suppressing a signal intensity of a specific pixel, which fulfils a predetermined condition established in advance among pixels represented by said high frequency band component signals.

24. The computer readable storage medium of claim 17, wherein said multi-resolution conversion is an orthogonal wavelet conversion or a bi-orthogonal wavelet conversion.

25. An apparatus for recording an output image onto an outputting medium, comprising:
a processing unit;
a reading section to read an image formed on a recording medium so as to generate image signals representing said image;
a processing section to process said image signals so as to generate output image signals representing said output image; and
a recording section to record said output image onto said outputting medium, based on said output image signals generated by said processing section;
wherein said processing section comprises:
a first converting section to apply a multi-resolution conversion processing of at least level 1, which is capable of reducing an image size of said image signals, to said image signals read by said reading section, so as to generate first-converted image signals from said image signals; and
a second converting section to apply a Dyadic Wavelet transform of at least level 1 to low frequency band component signals included in said first-converted image signals generated by said first converting section, so as to generate second-converted image signals from said first-converted image signals;
wherein no down-sampling is performed in said Dyadic Wavelet transform, and wavelet function $\psi_{i,j}(x)$ to be employed in said Dyadic Wavelet transform is defined by an equation shown below:

$$\left|\psi_{i,j}(x) = 2^{-i}\psi\left(\frac{x-j}{2^i}\right)\right|$$

where "i" and "j" denote natural numbers;
wherein an image size of said first-converted image signals is smaller than the image size of said image signals, while an image size of said second-converted image signals is identical to the image size of said first-converted image signals;

wherein said processing section further comprises a determining section to determine a changeover level from said multi-resolution conversion processing to said Dyadic Wavelet transform, based on a resolution of said image signals read by said reading section; and wherein said first converting section applies said multi-resolution conversion processing to said image signals according to said changeover level determined by said determining section, and said second converting section applies said Dyadic Wavelet transform to said low frequency band component signals according to said changeover level determined by said determining section.

26. The apparatus of claim 25, wherein said processing section further comprises:

a first image-processing section to apply a first image processing to said second-converted image signals generated by said second converting section.

27. The apparatus of claim 25, wherein said processing section further comprises:

a first image-processing section to apply a first image processing to high frequency band component signals included in said second-converted image signals generated by said second converting section.

28. The apparatus of claim 27, wherein said first image processing comprises suppressing a signal intensity of a specific pixel, which fulfils a predetermined condition established in advance among pixels represented by said high frequency band component signals.

29. The apparatus of claim 26, wherein said processing section further comprises:

a second image-processing section to apply a second image processing to said first-converted image signals generated by said first converting section.

30. The apparatus of claim 26, wherein said processing section further comprises:

a second image-processing section to apply a second image processing to high frequency band component signals included in said first-converted image signals generated by said first converting section.

31. The apparatus of claim 30, wherein said second image processing comprises suppressing a signal intensity of a specific pixel, which fulfils a predetermined condition established in advance among pixels represented by said high frequency band component signals.

32. The apparatus of claim 25, wherein said multi-resolution conversion is an orthogonal wavelet conversion or a bi-orthogonal wavelet conversion.

* * * * *